United States Patent
Komachiya et al.

(10) Patent No.: US 7,553,572 B2
(45) Date of Patent: Jun. 30, 2009

(54) FUEL CELL DEVICE AND FUEL CELL MANAGEMENT SYSTEM

(75) Inventors: Masahiro Komachiya, Hitachinaka (JP); Hiroshi Yamauchi, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 887 days.

(21) Appl. No.: 11/185,742

(22) Filed: Jul. 21, 2005

(65) Prior Publication Data

US 2007/0087236 A1    Apr. 19, 2007

(30) Foreign Application Priority Data

Jul. 21, 2004    (JP) .............................. 2004-212946

(51) Int. Cl.
  H01M 8/04    (2006.01)
  H01M 8/12    (2006.01)
(52) U.S. Cl. .............................. 429/22; 429/23; 429/24; 429/26; 429/19
(58) Field of Classification Search .................. 429/22, 429/19, 26, 23, 24, 34
  See application file for complete search history.

(56) References Cited

U.S. PATENT DOCUMENTS

2003/0008187 A1    1/2003    Higashiyama et al.

2004/0265658 A1 *  12/2004   de Vaal et al. .................. 429/22
2005/0003250 A1 *  1/2005    Toukura ....................... 429/22

FOREIGN PATENT DOCUMENTS

| JP | 2002-92769  | 3/2002  |
| JP | 2002-298892 | 10/2002 |
| JP | 2002-324566 | 11/2002 |
| JP | 2002-330557 | 11/2002 |
| JP | 2003-131730 | 5/2003  |
| JP | 2003-229159 | 8/2003  |
| JP | 2002-271233 | 9/2003  |

* cited by examiner

*Primary Examiner*—Raymond Alejandro
(74) *Attorney, Agent, or Firm*—Antonelli, Terry, Stout & Kraus, LLP.

(57)    ABSTRACT

A fuel cell device including a fuel cell stack unit, a fuel reform unit, a material feed unit, a cooling water supply unit, and a control unit further includes a memory section, constructed of a rewritable memory, for storing information necessary for maintenance or inspection of the fuel cell device. The memory section is partitioned into a use environment information memory area for storing use environment conditions, a material feed information memory area for storing attribute information of the material feed unit, a fuel reform information memory area for storing attribute information of the fuel reform unit, a cell stack information memory area for storing attribute information of the fuel cell stack unit and a cooling water supply information memory area for storing attribute information of the cooling water supply unit.

18 Claims, 9 Drawing Sheets

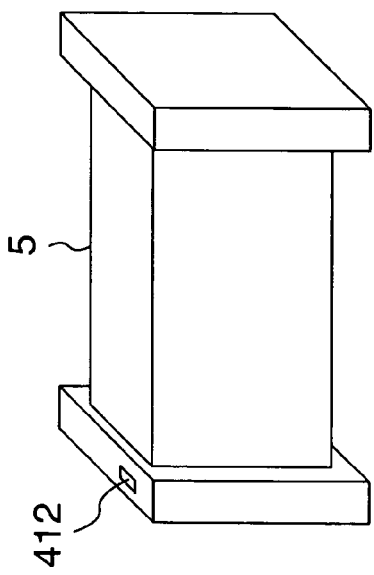
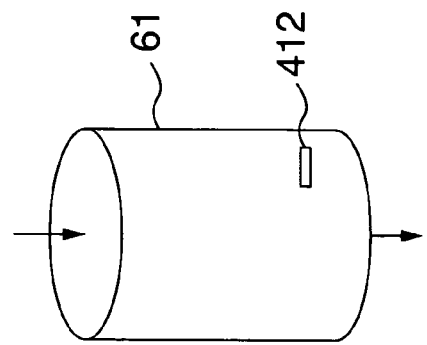
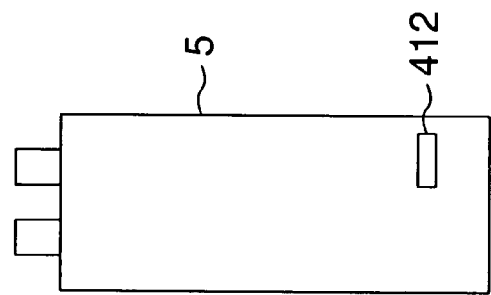
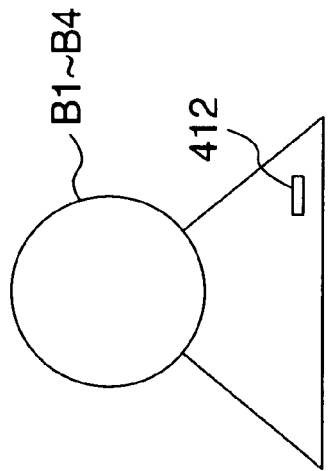

FUEL CELL DEVICE AND FUEL CELL MANAGEMENT SYSTEM

CROSS-REFERENCE TO RELATED APPLICATION

This application relates to JP-A-2003-271233 filed on Mar. 19, 2002 assigned to the present assignee. The content of the application is incorporated herein by reference.

BACKGROUND OF THE INVENTION

The present invention relates to a polymer electrolyte fuel cell (PEFC) and more particularly, to a fuel cell device using the PEFC and a fuel cell management system.

The fuel cell device using the PEFC is utilized in general. In addition, how to construct and control a hydrogen production apparatus has been studied for the sake of its practical operation. As an example, US 2003/0008187A1 (Patent Document 1) proposes in FIG. 1 a power generation system using a hydrogen production apparatus capable of optimally maintaining the temperature of a reform reactor in operation irrespective of the scale of production volumes of hydrogen.

The aforementioned Patent Document 1 contemplates trade-off between reduction in costs of the equipment and maintenance/stabilization of accuracies of hydrogen production. The reaction can be stabilized through simplified control but, on the other hand, management of individual component units constituting the fuel cell device is not referred to.

In the case of the fuel cell device, however, a trader concerned in offering materials is a gas company, a trader concerned in hot water reserve/supply is a waterworks dealer and an electric power company is concerned in an electric system, demonstrating that traders juridically in charge of different functions are not always integrated into a single company, and besides expert manufacturers are sometimes concerned in a fuel reform unit and a fuel cell stack unit, respectively. In consequence, mutual contact cannot always be made, having difficulty in assuring systematic maintenance of the fuel cell device.

Recently, the fuel cell device has been packaged so that it may be used as a home subsidiary power source on trial. For domestic widespread use, achievement of systematic maintenance and stable operation of the fuel cell device has been desired.

SUMMARY OF THE INVENTION

An object of this invention is to provide a fuel cell device in which conditions of maintenance/inspection of individual component units constituting the fuel cell device can be known easily to assure systematic maintenance and stable power generation operation.

Another object of this invention is to provide a fuel cell management system capable of constantly grasping conditions of maintenance/inspection of individual component units constituting a fuel cell device to assure systematic management of maintenance easily.

To accomplish the above objects, according to the present invention, a fuel cell device having a material feed unit for feeding fuel of hydrocarbon system (for example, natural gas, liquefied petroleum gas (LPG), kerosene, methanol and so on), a fuel reform unit for taking out hydrogen from the material fed from the material feed unit and feeding a gas containing hydrogen, a fuel cell stack unit for generating power from the hydrogen fed from the material reform unit and air, a cooling water supply unit for supplying cooling water to the fuel cell stack unit to control its temperature in order for the fuel cell stack unit to generate electric power stably and a control unit for controlling power output generated from the fuel cell stack unit in compliance with use purposes, comprises a memory unit for storing information necessary for maintenance or inspection of the fuel cell device, wherein the memory unit includes a rewritable memory and stores information internal of the memory unit in a partitive memory area comprised of a use environment information memory area for storing use environmental conditions, a material feed information memory area for storing attribute information of the material feed unit, a material reform information memory area for storing attribute information of the fuel reform unit, a cell stack information memory area for storing attribute information of the fuel cell stack unit and a cooling water supply information memory area for storing attribute information of the cooling water supply unit.

According to the present invention, conditions of maintenance/inspection of the individual component units constituting the fuel cell device can be known with ease and maintenance can be carried out systematically on the spot to permit stable power generation operation.

Also, according to this invention, conditions of maintenance/inspection of the individual units constituting the fuel cell device can be grasped constantly to facilitate not only maintenance on the spot but also systematic maintenance management.

Other objects, features and advantages of the invention will become apparent from the following description of the embodiments of the invention taken in conjunction with the accompanying drawings.

BRIEF DESCRIPTION OF THE DRAWINGS

FIG. 3A is a diagram showing a state of a wireless tag (RFID tag) mounted to a columnar fuel cell stack unit.

FIG. 3B is a diagram showing a state of a wireless tag (RFID tag) mounted to a box-shaped (rectangular) fuel cell stack unit.

FIG. 3C is a diagram showing a state of an IC chip constituting a wireless tag (RFID tag) mounted to a blower.

FIG. 3D is a diagram showing a state of an IC chip constituting a wireless tag (RFID tag) mounted to a water treatment section of cooling water supply unit.

DESCRIPTION OF THE EMBODIMENTS

Figure 1:
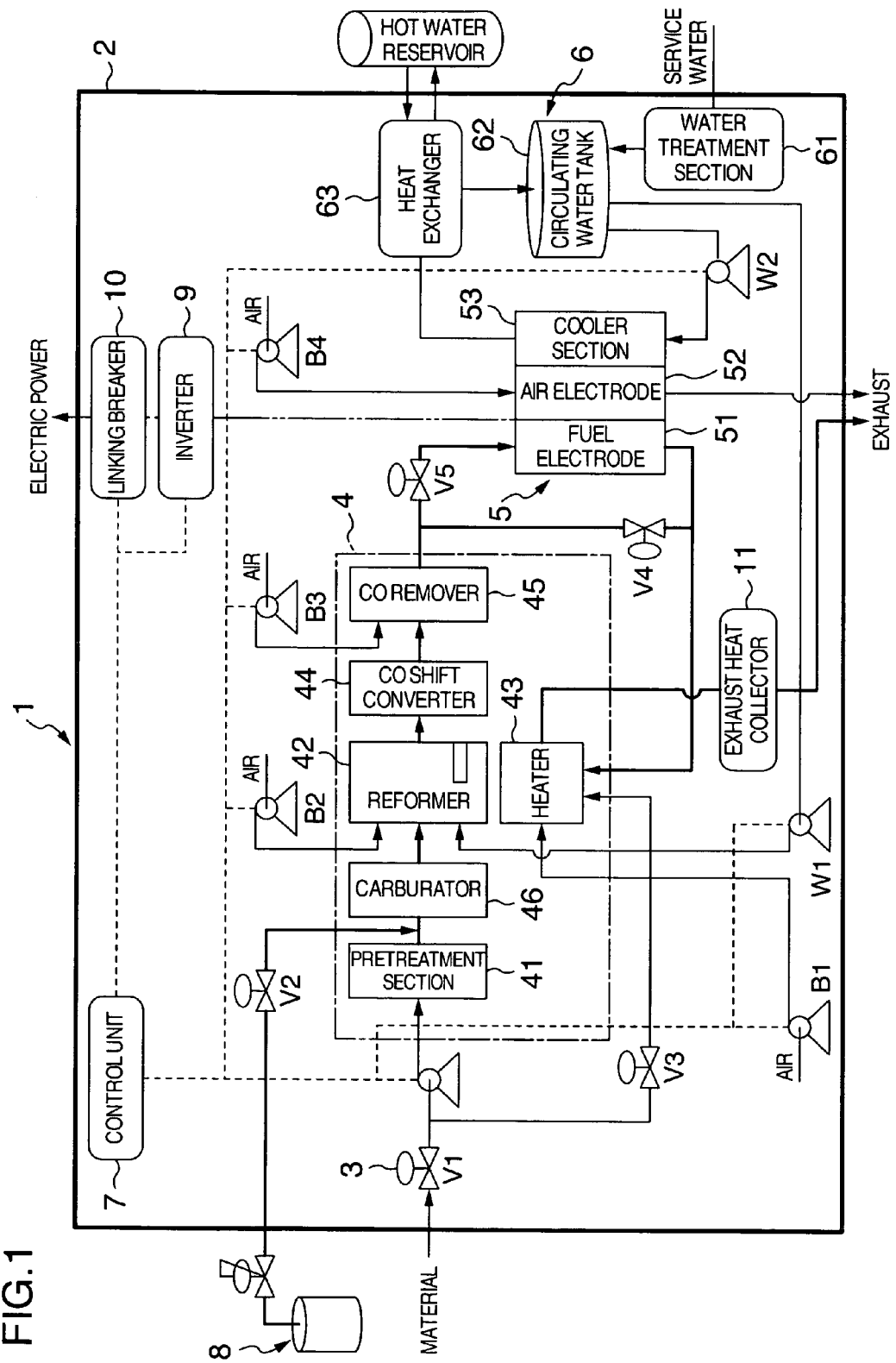
FIG. 1 is a diagram showing the overall construction of a fuel cell power generation system.

A fuel cell device according to the present invention has a material feed unit for feeding fuel made from natural gas, liquefied petroleum gas (LPG) or petroleum (for example, kerosene, gas oil, fuel oil, clean hydrocarbon and the like), a fuel reform unit for taking out hydrogen from the material fed from the material feed unit and feeding the hydrogen, a fuel cell stack unit for generating power from the hydrogen fed from the fuel reform unit and air, a cooling water supply unit for supplying cooling water to the fuel cell stack unit to control its temperature in order for the fuel cell stack unit to generate electric power stably and a control unit for controlling power output generated from the fuel cell stack unit in compliance with use purposes. The fuel cell device comprises a rewritable memory unit for storing information internal of the memory unit in a partitive memory area comprised of a use environment information memory area for storing use environmental conditions, a material feed information memory area for storing attribute information of the material feed unit, a fuel reform information memory area for storing attribute information of the fuel reform unit, a cell stack information memory area for storing attribute information of the fuel cell stack unit and a cooling water supply information memory area for storing attribute information of the cooling water supply unit, and the memory unit is constructed so that information stored in the memory may be acquired or accessed externally in a non-contact fashion. A wireless tag for writing information obtained externally into the memory unit is attached to each component unit to ensure that the attribute information of each unit can be acquired or accessed externally in a non-contact fashion.

Also, a fuel cell management system according to the present invention comprises a fuel cell device having a material feed unit, a fuel reform unit for taking out hydrogen from the material fed from the material feed unit and feeding it, a fuel cell stack unit for generating power from the hydrogen fed from the fuel reform unit and air, a cooling water supply unit for supplying cooling water to the fuel cell stack unit in order for the fuel cell stack unit to generate power stably and a control unit for controlling power output generated from the fuel cell stack unit in compliance with use purposes and a rewritable memory unit. The memory unit is constructed so that information stored in the memory unit may be acquired or accessed externally. Wireless tags for writing information obtained externally into the memory unit are attached to one or two or more units of the material feed unit, fuel reform unit, fuel cell stack unit, cooling water supply unit and control unit constituting the fuel cell device. Information of maintenance of each unit after its installation which is stored in a tag information memory area of a wireless tag is periodically collected and analyzed, whereby the fuel cell device can be managed in such a manner that time to conduct the next maintenance of each unit constituting the fuel cell device can be predicted and an optimum power generation condition of the fuel cell device can be maintained.

An embodiment of a fuel cell device according to the present invention will now be described in greater detail.

Referring first to FIG. 1, the fuel cell device of this invention is constructed as shown therein.

In FIG. 1, a fuel cell power generation system generally designated by reference numeral 1 is employed to supply hot water or generate electric power by using a fuel cell. A fuel cell device 2 drives the fuel cell to generate electric power. The fuel cell device 2 comprises a material feed unit 3, a fuel reform unit 4, a fuel cell stack unit 5, a cooling water supply unit 6 and a control unit 7.

The material feed unit 3 feeds a material for production of hydrogen represented by gas fuel such as town gas (natural gas) or LPG (liquefied petroleum gas) or liquid fuel such as kerosene made from petroleum or other oils. The liquid fuel may be fed after being gasified. The material feed unit 3 includes a control valve V1 and a booster not shown. For safety, two control valves V1 arranged in series may be used. Alternatively, a feeder of the fuel such as town gas and a feeder of air and water may be put together to constitute the material feed unit 3.

The fuel reform unit 4 creates hydrogen ($H_2$) from gas fuel such as town gas (natural gas) or LPG (liquefied petroleum gas) representing the material fed from material feed unit 3 or from fuel obtained by gasifying liquid fuel such as kerosene made from petroleum or others and feeds the created hydrogen. As an example, the fuel reform unit 4 includes a pretreatment section (specifically, desulfurization section) 41, a reformer 42, a heater 43, a CO shift converter 44 and a CO remover 45. The pretreatment section 41 is adapted to eliminate a specified ingredient from the material fed from the material feed unit 3. The reformer 42 uses the material fed from the material feed unit 3 and oxygen and generates heat to create hydrogen principally on the basis of an endothermic reaction. The production of hydrogen based on the endothermic reaction in the reformer 42 requires heat and the heater 43 supplies the necessary heat.

To describe more specifically, the heater 43 supplies to the reformer 42 the heat used for endothermic reaction to thereby promote the endothermic reaction. As an example, the heater 43 is a gas burner and a gas serving as fuel for the heater 43 is supplied from the material feed unit 3. The heater 43 supplies the heat externally of a reaction tube as in the case of steam reform or, alternatively, it supplies the heat by dint of oxidation catalyst provided internally of the reaction tube as in the case of auto-thermal reform or partial oxidation reform. In the latter case, air is supplied to the reformer 42 by means of a blower, for instance. Denoted by 46 is a carburetor.

The reformer 42 may use nitrogen gas to purge residual gas during operation stop. A nitrogen gas feeder 8 is illustrated as being disposed externally of the fuel cell device but depending on a method for stop of operation, the feeder 8 may be omitted.

The CO shift converter 44 is adapted to reduce CO density through shift equilibrium reaction.

The CO remover 45 reduces CO density by oxidizing a small quantity of residual CO to ultimately decrease the residual CO density to about several of ppms. Depending on the type of the CO remover 45, in addition to air, a small amount of water may be added.

The fuel cell stack unit 5 uses the hydrogen fed from the fuel reform unit 4 and air to generate electric power. A plurality of unit cells each having an ion-exchange membrane and a catalyst electrode with an intervening bipolar plate are stacked to form the fuel cell stack unit. More specifically, the unit cell is constructed by forming a fuel electrode and an air electrode (catalyst membrane) on both sides of a polymer electrolyte membrane, integrating a resulting structure to provide an MEA and attaching a porous support layer (gas diffusion layer) to the outer side of the catalyst membrane with an intervening bipolar plate. The fuel cell stack unit 5 has the fuel electrode designated by reference numeral 51, the air electrode designated by reference numeral 52 and a cooler section 53. Typically, for the cooler section 53, the laminated bipolar plate is partly used as a cooling bipolar plate and cooling water is passed through the cooling bipolar plate for the sake of temperature management but alternatively, water may be supplied directly to a gas conduit to fulfill both cooling and humidification. The cooling section is used not only to effect cooling but also to pass circulating water temporarily heated by means of heater at the time of start so as to raise temperature in the fuel cell stack unit up to a predetermined temperature. Generally, the fuel cell stack unit can be subjected to temperature control. Though not illustrated, a humidifier or humidification adjuster may be attached to the fuel cell stack unit 5. Further, water created by reaction may be collected from exhaust gas discharged from the air electrode 52.

In the fuel cell stack unit 5, electric power is generated through an electrochemical reaction by supplying a reform gas to the fuel electrode 51, an oxidizing agent such as air (or oxygen gas) to the air electrode 52 and cooling water to the cooling section 53.

The cooling water supply unit 6 supplies cooling water to the fuel cell stack unit 5 to permit it to generate power stably under the control of temperature in the fuel cell stack unit 5. More specifically, the supply unit 6 supplies pure water to the cooling section 53 of fuel cell stack unit 5, returns ion exchange water used for cooling by the cooler section 53 to pure water and circulating the pure water. The cooling water supply unit 6 includes a water treatment section 61, a circulating water tank 62 and a heat exchanger 63. Used as water supplied to the cooling water supply unit 6 is service or city water which in turn is changed to pure water by means of the water treatment section 61 and supplied to the circulating water tank 62 so as to be reservoired therein. From the circulating water tank 62, the cooling water is supplied to the cooler section 53 via a pump W2. By means of a pump W1, the water may be supplied from the circulating water tank 62 to the steam reform reaction.

A control unit 7 is adapted to control power output generated by the fuel cell stack unit 5. The power generated by the fuel cell stack unit 5 is DC/AC converted by means of an inverter 9 and is delivered through a linking breaker 10. Then, the control unit 7 controls the whole of fuel cell power generation system 1 by controlling the inverter 9 in accordance with a load and a generation command and controlling subsidiary machines such as air blowers B1 to B4 and pumps W1 and W2.

An exhaust or waste heat collector 11 collects heat of waste gas generated when the material and reform gas are burnt in the heater 43. Collected heat may be utilized for a source for heating hot water in the hot water reservoir.

In the light of information management to be described later, the rotary machine such as air blowers B1 to B4 and pumps W1 and W2, the heat exchanger 63, the breaker valves V1 to V5 and a measurement instrument such as thermostat (not shown) may be classified to subsidiary equipment. But, functional classification may otherwise be made by sorting components concerned in material supply function to the material feed unit 3, components concerned in fuel reform function to the fuel reform unit 4, components concerned in cell stack function to the fuel cell stack unit 5 and components concerned in cooling function to the cooling water supply unit 6. Alternatively, components concerned in other functions than cooling may be sorted to the material feed unit 3 or may be unified to the fuel reform unit 4.

Figure 2A:
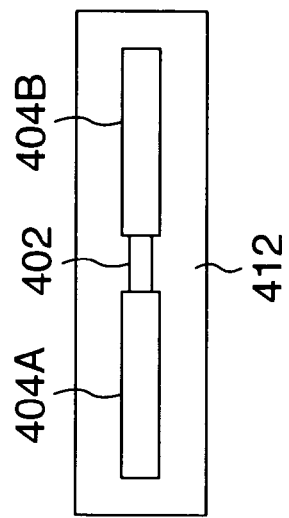
FIG. 2A is a diagram showing the construction of a wireless tag (radio frequency identification (RFID) tag or IC chip) having memory areas.

Referring now to FIG. 2A, there is illustrated a RFID (radio frequency identification) tag. The tag is a wireless tag constructed of a non-contact IC chip, having a rewritable memory. The wireless tag is constructed such that information stored in the memory can be acquired or accessed externally and information obtained externally can be written in the memory.

In the figure, the IC chip designated by reference numeral 402 includes an antenna section 404, a power supply section 406, a logical section 408 and a memory section 410. In the non-contact IC chip 402, a power source can be set up and transmission/reception of clock and data can be effected by receiving an electric wave sent to the antenna section 404 from a read/write unit (R/W unit). The antenna section may be provided either internally of the IC chip 402 or externally thereof. Illustrated in FIG. 2A is the former type but the antenna may be provided externally. In forming an antenna section provided externally of the chip, the antenna section is attached to the outer side of the chip. The non-contact scheme between the R/W unit and the antenna section can be materialized in some ways including electromagnetic induction and any types of non-contact can be applied to the antenna section 104 in the present embodiment.

Operation of the IC chip 402 will be described. An electric wave is received by the antenna section 404 and converted to set up a power source by means of the power supply section 406, the thus obtained power source being used by circuits throughout the IC chip 402. From the electric wave received by the antenna section 404, a clock component is derived which is used as a clock for the circuits throughout the IC chip 402. The logical section 408 follows a command sent from the R/W unit to carry out a process.

The memory section 410 provides an area for storing information to be stored in the IC chip 402. The memory section 410 has a partitive memory area which is exemplarily used as follows.

More particularly, the memory section 410 has a tag information partitive memory area comprised of a use environment information memory area for storing use environment conditions, a material feed information memory area for storing attribute information of the material feed unit, a fuel reform information memory area for storing attribute information of the fuel reform unit, a cell stack information memory area for storing attribute information of the fuel cell stack unit and a cooling water supply information memory area for storing attribute information of the cooling water supply unit. As will be seen from the above, a memory area concerned in the subsidiary machine may be provided separately or may be unified into any of the aforementioned memory areas.

As an example, the use environment information memory area for storing use environment conditions includes a memory area for storage of information for specifying conditions of a geographical environment in which the fuel cell device is installed, a memory area for storage of information for specifying conditions of a meteorological environment in which the fuel cell device is installed and a memory area for storage of information for specifying physical conditions in which the fuel cell device is installed.

The material feed information memory area for storing attribute information of the material feed unit includes a memory area for storage of information for specifying at least the kind of material, a memory area for storage of information for specifying an ingredient of the material, a memory area for storage of information for specifying a maximum supply volume per unit time of material, a memory area for storage of information for specifying a manufacture company of the material feed unit, a sub-memory area for storage of information for specifying a manufacture date of the material feed unit and a memory area for storage of information for specifying individual products of material feed units.

Further, as an example, the fuel reform information memory area for storing attribute information of the fuel reform unit includes a memory area for storage of information for specifying at least the ability to reform material the fuel reform unit has, a memory area for storage of information for specifying a manufacture company of the fuel reform unit, a memory area for storage of information for specifying a manufacture date of the fuel reform unit and a memory area for storage of information for specifying individual products of fuel reform units.

For example, pieces of information in a wireless tag attached to the fuel reform unit are stored in a rewritable memory having, for instance, a reformer information memory area for storing attribute information of the reformer, a heating information memory area for storing attribute information of the heater, a CO transform information memory area for storing attribute information of the CO shift converter and a CO removal information memory area for storing attribute information of the CO remover. These pieces of information are obtainable or accessible externally.

Also, the cell stack information memory area for storing attribute information of the fuel cell stack unit includes, for example, a memory area for storage of information for specifying at least the ability to generate electric power the fuel cell stack unit has, a memory area for storage of information for specifying a manufacture company of the fuel cell stack unit, a memory area for storage of information for specifying a manufacture date of the fuel cell stack unit and a memory area for storage of information for specifying individual products of fuel cell stack units.

Furthermore, the cooling water supply information memory area for storing attribute information of the cooling water supply unit includes, for example, a memory area for storage of information for specifying at least the kind of cooling water supply unit, a memory area for storage of information for specifying a maximum supply volume per unit time of cooling water, a memory area for storage of information for specifying a manufacture company of the cooling water supply unit, a memory area for storage of information for specifying a manufacture date of the cooling water supply unit and a memory area for storage of information for specifying individual products of cooling water supply units and a memory area for storage of information for specifying time to conduct maintenance of water treatment by the cooling water supply unit.

Preferably, a rewritable memory (RAM) may be used as the memory section 410 of IC chip 402 used for the RFID tag (wireless tag) of the present embodiment. Among pieces of data in the RAM type wireless tag, basic data (attribute information of each unit) is written in the course of manufacture in the factory and is therefore protected even after the wireless tag is transferred to a customer. In other words, the basic data is set with write protector after being written, so that it can be permitted for read but cannot be permitted for write. In respect of individual products of units, the basic data includes information for specifying a manufacture maker, information for specifying a trader concerned in installation or location, information for specifying a manufacture date and information for specifying individual products of units. Each of the above pieces of information is allotted with a private information memory area and is stored therein. After identification information of each unit has been stored in the private information memory area, the write protector can be set.

The size of capacity of the memory section 410 is 128 bytes or 256 bytes, for example, and the memory area of memory section 410 has pages of which one page is of addresses of 8 bytes. Data are stored in the memory section 410 page by page.

Since a plurality of technical fields such as those of gas, waterworks and electric service are concerned with operation of the fuel cell device 2, these plural fields are also related to system maintenance. Accordingly, it is effective that the memory section 410 has an information write memory area partitioned into a common information memory area capable of being read unlimitedly by persons concerned in the fuel cell device and a personal information memory area capable of being read by only a specified person among those concerned in the fuel cell device. In this case, the partitive memory areas may be provided irrespective of sorting of the individual units.

For example, when a person qualified for gas service carries out a periodical inspection, information as to whether an external appearance inspection of a gas pipe is acceptable, information as to whether gas is leaking and besides information as to what volume of gas has been consumed are designed to be recorded on the spot to a non-contact wireless tag from a portable terminal.

Then, by storing the information of external appearance and the information concerning the presence or absence of leakage of gas in the common information memory area to enable persons concerned in other technical fields to also consult the information, a person qualified for electrical service, for example, can easily confirm on the spot that no gas leakage and no water leakage arose in the past when searching for causes of electrical trouble, thereby ensuring that countermeasures narrowed down to electricity can be proceeded with and causes can be identified with ease to speed up coping with the situation on the spot. In comparison with central management, a single field worker can manage to deal with the situation, much time is not consumed for extraction of information and information is not mistaken for erroneous one, with the result that the trouble can be handled steadily and accurately.

In contrast, the information as to what consumption volume of gas runs is one which suffices to be knowable by a gas company as information of its own and from the standpoint of protection of customer's privacy, too, the information cannot afford to be disclosed positively to persons concerned in other technical fields. Accordingly, this kind of information is stored in the personal information memory area capable of being read or accessed by only a specified person among those concerned in the fuel cell device.

According to a method, the memory section 410 is divided into two areas in order that the common information memory area and personal information memory area can be managed by using passwords, for instance. But, alternatively, when a single information memory area is provided, data pieces with predetermined specified identifiers are stored and only a specified person among those concerned in the fuel cell device is allowed to read the data pieces with specified identifiers, the effects substantially comparable to those obtainable when the memory section 410 is divided into the two areas of common information memory area and personal information memory area. In other words, information inaccessible from persons concerned in other technical fields in the light of consumer's privacy protection can be managed as exclusive message (personal information). With the personal information allotted with data representative of a predetermined identifier (common to write and read) when being recorded in the personal information memory area, it can be stored along with common information in the same non-contact type wireless tag and complexity of the memory structure can be avoided.

For example, the information concerning gas consumption volume is useful as information concerning management of a gas company and besides, in trouble shooting on the spot, it can be reference information for search of causes of gas leakage if an abnormal increase in gas consumption going backing to the past is clarified and therefore, by managing this kind of information as personal information on the spot, not only the privacy protection but also trouble shooting the company of its own takes charge of can be facilitated.

The information management method as above is a mere example and in fact, by steadily consulting more information on the spot, trouble shooting can be carried out speedily in the fuel cell to which different technical fields are sophisticatedly related to. Since the common information and personal information can be managed in common with individual non-contact wireless tags, the memory structure can be freed from complexity to meet practical use. Further, workers particularly qualified in all technical fields of, for example, gas service, waterworks and electrical service are not always needed and hence practicability of the system maintenance can be facilitated. In addition, by setting exclusive message in advance, the privacy protection can be assured steadily.

As described above, by dividing the information write memory area into two information memory areas, that is, tag information memory areas of common information memory area capable of being read unlimitedly by persons concerned in the fuel cell device and personal information memory area capable of being read by only a specified person among those concerned in the fuel cell device, maintenance of individual parts or components constituting the system can also be effected in a similar way. For example, in case the stack becomes abnormal and a stack manufacture company (sometimes identical to a system manufacture company) detects and confirms abnormality of the stack on the spot, this company can easily make reference to various kinds of histories, falling under the jurisdiction of utilities or companies concerned, of, for example, the presence or absence of gas leakage, the presence or absence of abnormality in electrical system and exchange of filter and consequently, causes of the occurrence of abnormality can be specified in an early stage and as necessary, the company can consult with persons in charge of management of the technical field concerned about countermeasures.

Figure 2B:
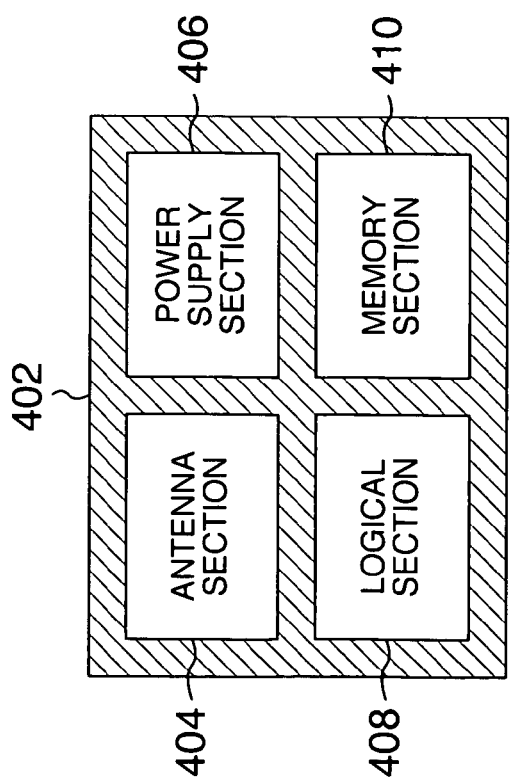
FIG. 2B is a diagram showing the construction, as viewed from above, of a seal with IC chip having an IC chip mounted to a seal.

Turning now to FIG. 2B, there is illustrated an embodiment of the IC chip 402. Antennas 404A and 404B for enabling the non-contact IC chip 402 to perform transmission/reception to/from a read/write unit are incorporated, together with the IC chip 402, in a seal 412 for reinforcement. Wireless tags each having the IC chip 402 are attached to, for example, the material feed unit 3, fuel reform unit 4, fuel cell stack unit 5 and control unit 7, respectively. A wireless tag is also attached to the nitrogen gas feeder 8. Further, wireless tags may also be attached separately to the reformer 42, heater 43, CO shift converter 44 and CO remover 45.

Figure 2C:
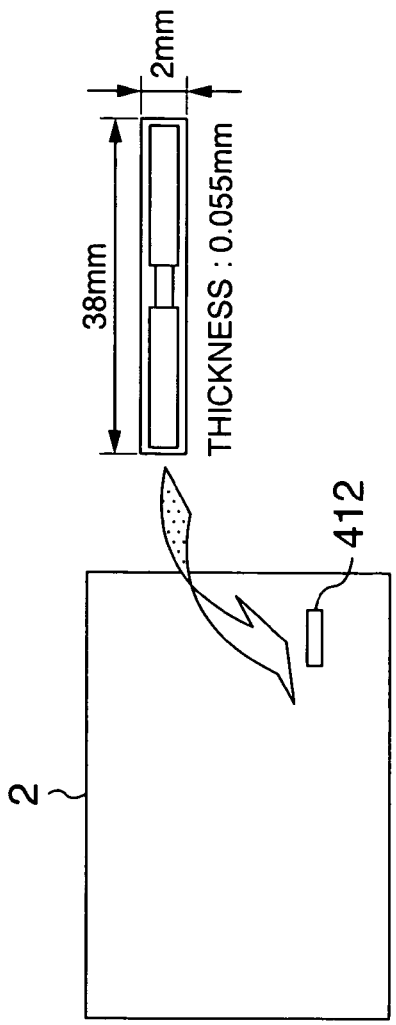
FIG. 2C is a diagram useful to explain a method of mounting to the fuel cell power generation system a wireless tag (RFID tag) having a system information memory area for the fuel cell power generation system.

A wireless tag having a system information memory area for the fuel cell power generation system 1 according to this invention is attached to the system 1 as shown in FIG. 2C.

In FIG. 2C, a wireless tag to be attached to each of the fuel cell device 2, material feed unit 3, fuel reform unit 4, fuel cell stack unit 5, cooling water supply unit 6 and control unit 7 is constructed of the non-contact IC chip 402. The IC chip has a rewritable memory which is so constructed that information stored in the memory can be obtained or accessed externally and externally acquired information can be written into the memory. The IC chips 402 are attachable to all of the component units. With the IC chips 402 attached to all of the individual units, differences in identity representing quality, history and the like among the individual units can be dealt with easily. Exemplarily, the IC chip 402 can be bonded to each unit.

In case a good number of IC chips 402 cannot be attached, a less number of IC chips may substitute for or a single IC chip may be attached to one system. In this case, by readjusting setting of the memory area of IC chip in such a manner that management of necessary information can be assured, similar effects to the above can be attained.

The IC chip 402 constituting the wireless tag is desired to be as thin as possible and for example, the thickness is less than 1 mm, preferably, 0.55 mm or less, the width is less than 5 mm, preferably, 2 mm or less and the length is less than 45 mm, preferably, 38 mm or less.

The frequency band used for the IC chip 402 constituting the wireless tag (RFID tag) is, for example, 134.2 KHz, 13.56 MHz or 2.45 GHz. The 134.2 KHz is insusceptible to the influence of external factors such as noise or water. The 13.56 MHz is often used for a card type RFID tag. The 2.45 GHz is for a system using a microwave and is effective to a relatively prolonged communication distance. For the IC chip 402 constituting the wireless tag of the present embodiment, 2.45 GHz, for instance, is used to assure communication characteristics used.

The IC chip 402 is shaped into a sheet-like or bar-like (line-like) form with a view to facilitating its mount and it has a built-in memory for holding information. This memory is of 128 bytes, for instance, and has an information transmissible/receivable distance of, for example, within 1000 mm for read and within 700 mm for write. In other words, by approaching the R/W unit or a handy type R/W unit to this read/write range, read/write from/to the IC chip can be permitted. The heat resisting temperature ranges from −40° to +95°, for instance.

A wireless tag can be attached to a columnar fuel cell stack unit 5 as shown in FIG. 3A and a wireless tag can be attached to a box-like (rectangular) fuel cell stack unit 5 as shown in FIG. 3B.

The IC chip 402 is positioned at an end plate electrically insulated from a power feeder. The IC chip 402 may otherwise be arranged on the outer peripheral surface or inner peripheral surface of casing of the fuel cell device 2. Alternatively, the IC chip may be embedded in the fuel cell stack. Of course, it suffices that a single IC chip 402 constituting a wireless tag is provided in respect of each fuel cell stack unit 5.

The IC chip 402 is disposed on a bedplate of the blower B1, B2, B3 or B4 as shown in FIG. 3C. Of course, it suffices that a single IC chip 402 constituting a wireless tag is provided in respect of each of the blowers B1 to B4.

The IC chip 402 is disposed on the outer peripheral surface of water treatment section 61 of the cooling water supply unit 6 as shown in FIG. 3D. To be protected against dashed or sprinkled water, the IC chip can be disposed inside a waterproof unit or beneath a protective cover. Of course, it suffices that a single IC chip 402 constituting a wireless tag is provided in respect of each water treatment section 61 of cooling water supply unit 6.

Depending on how to use the memory area, a single IC chip 402 provided for the system may suffice.

Figure 4:
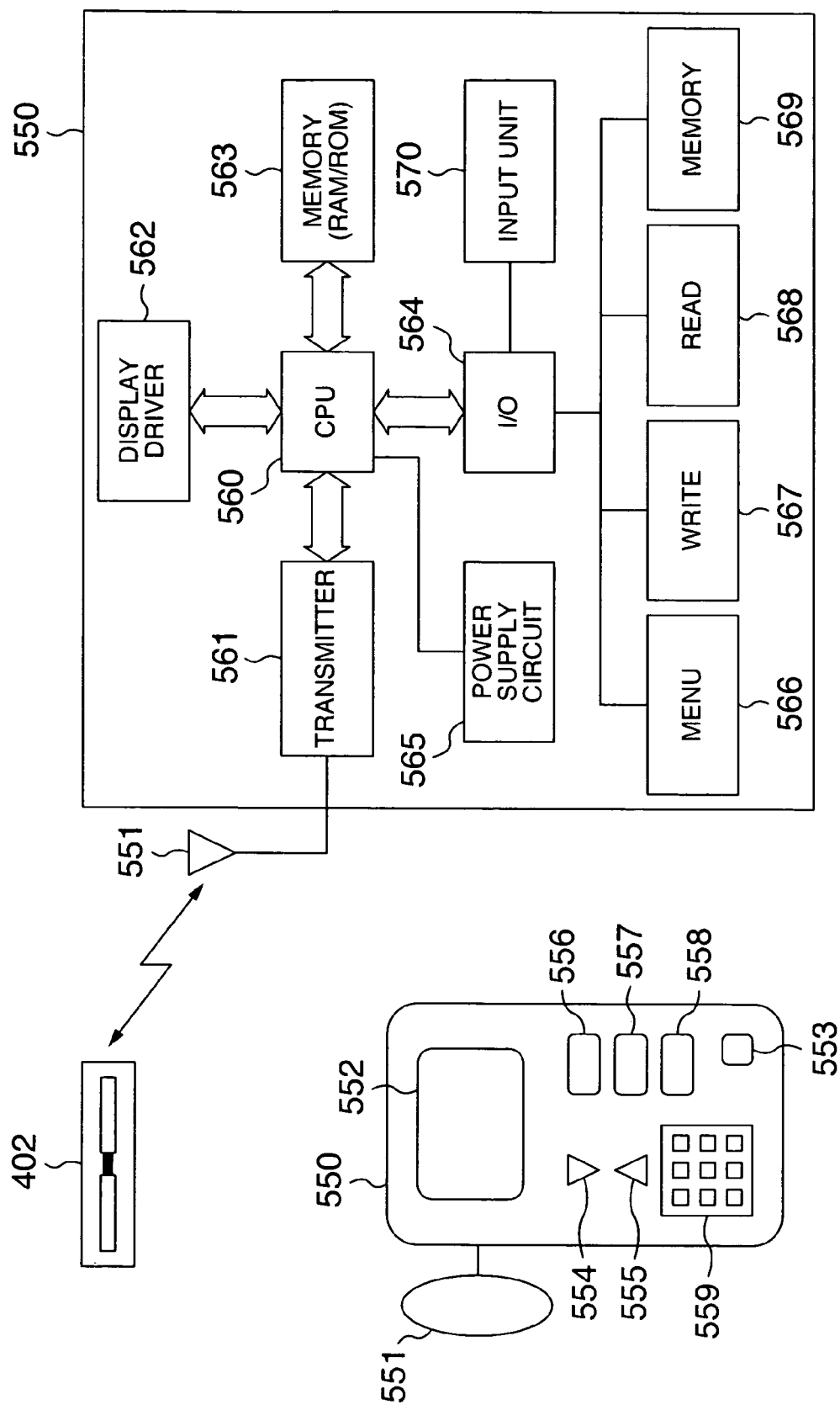
FIG. 4 is a diagram showing an external appearance of a wireless tag (RFID tag) having a system information memory area for the fuel cell power generation system, an external appearance of a read/writ unit (R/W unit) and a schematic circuit construction of the R/W unit.

Referring to FIG. 4, an embodiment of the wireless tag (RFID tag) having the system information memory area for the fuel cell power generation system and the read/write unit (R/W unit) according to the invention will be described.

An antenna 551 is adapted for communication with an IC chip 402 constituting a wireless tag. A display 552 displays contents of a process executed by a read/write unit 550 for read/write from/to the wireless tag. A power supply switch (ON/OFF switch) 553 operates to start the read/write unit 550. Menu switches 554 and 555 are adapted to select write contents and read contents which are written/read by the read/write unit 550 through communication with the IC chip 402 constituting the wireless tag and they can scroll the display contents.

A write switch 556 activates the read/write unit 550 to communicate with the IC chip 402 so as to set the write mode of writing data into the memory section 410 via the antenna section 404 and logical section 408. A read switch 557 activates the read/write unit 550 to communicate with the IC chip 402 so as to set the read mode of reading data stored in memory section 410 via the antenna section 404 and logical section 408 of the IC chip 402 constituting the wireless tag.

When writing data in the memory section 410, a storage switch 558 acts as a storage settle button for storing, as data, information displayed on the display 552 in the memory section 410 in the write mode. When reading data from the memory section 410, the storage switch 558 acts as a storage settle button for reading data selected by the menu switches 554 and 555 and storing it in the read/write unit 550 in the read mode. An input switch 559 is adapted to display numerical values (data) inputted from a keyboard on the liquid crystal type display 552.

An example of circuit construction of the read/write unit 550 is also depicted in FIG. 4. The read/write unit 550 has a CPU 560 which is coupled to a transmitter 561, a display driver 562, a memory (RAM/ROM) 563 and an input/output (I/O) circuit 564 through the medium of bus lines. The CPU 560 is also connected with a power supply circuit 565 for starting the read/write unit 550. The I/O circuit 564 is connected with a menu selection circuit 566, a write circuit 567, a read circuit 568, a memory (RAM/ROM) drive circuit 569 and an input unit 570.

The CPU 560 controls the transmitter 561, display driver 562, memory (RAM/ROM) 563 and I/O circuit 564, respectively, to rewrite data in the memory section 410 of IC chip 402 and to read data stored in the memory section 410 of IC chip 402. The power supply circuit 565 connected to the CPU 560 feeds the read/write unit 550.

The transmitter 561 transmits an electric wave to the antenna section 404 of IC chip 402 through the antenna 551.

The display driver 562 is activated when necessary information is to be displayed on the display 552.

The memory (RAM/ROM) 563 operates to store data to be written in the memory section 410 of IC chip 402 through logical section 408 when the electric wave is transmitted to the antenna section 404 of IC chip 402 and it operates to store data stored in the memory section 410 of IC chip 402 and read from the antenna section 404 via logical section 408 when the electric wave is transmitted to the antenna section 404 of IC chip 402. As an example, the memory 563 has an IC chip data memory area, an IC chip management memory area, a memory area of items of data written to the IC chip, an IC chip write data management memory area, a memory area of items of data read from the IC chip, an IC chip read data management memory area, a customer management memory area and a fuel cell power generation system management memory area.

In the IC chip management memory area, such data to be written to any IC chip 402 as management data for identifying each IC chip 402 (ID code No) is stored by allotting the data with a management address different for each IC chip 402.

There are necessary items of data to be written to any of IC chips (manufacture maker name, manufacture factory name, manufacture date and device type) and items of contents of the data (information specifying the manufacture maker of the device, information for specifying the manufacture factory of the device, information for specifying the manufacture date of the device and information for specifying individual products of devices). All of the items as above are stored in the IC chip write data item memory area.

Stored in the IC chip write data management memory area are management data (ID code No) written to the IC chip 402 to identify the IC chip 402 and a necessary item of data.

Stored in the IC chip storage data item memory area are necessary items of data to be stored in the IC chip 402 and contents of the data.

There are management data (ID code No) written to the IC chip 402 to identify the IC chip 402, data necessary for management (information for specifying a manufacture maker, information for specifying a manufacture factory of the device, information for specifying a manufacture date and information for specifying individual products of devices), storage necessary items of stored data and read contents of data. All of the above items are stored in the IC chip read data item memory area.

Management data (ID code No) recorded in the memory section 410 of IC chip 402 to identify the IC chip 402, data necessary for management, storage necessary data item and data contents are each read out of the memory section 410 of IC chip 402 and stored in the IC chip read data management area.

The customer management memory area is adapted to manage a customer possessing the device attached with the IC chip 402 and specifically, it stores name, address, birth date/age/sex and telephone number of the customer, communication equipment address and device management number by making the correspondence of them with the management data (ID code No) for identifying the IC chip 402.

Stored in the fuel cell power generation system management memory area are scale of the fuel cell power generation system to which the IC chip 402 is attached, installation date of the fuel cell power generation system and record of adjustment/inspection of the fuel cell power generation system.

The IC chip data memory area is for storing externally given information data related to the fuel cell power generation system and is set with a rewritable area including a memory area of management data (ID code No) for identifying the IC chip 402, a memory area of information data for specifying a manufacture maker of the fuel cell power generation system, a memory area of information data for specifying a manufacture date of the fuel cell power generation system and a memory area of information data for specifying individual products of fuel cell power generation systems.

Figure 5:
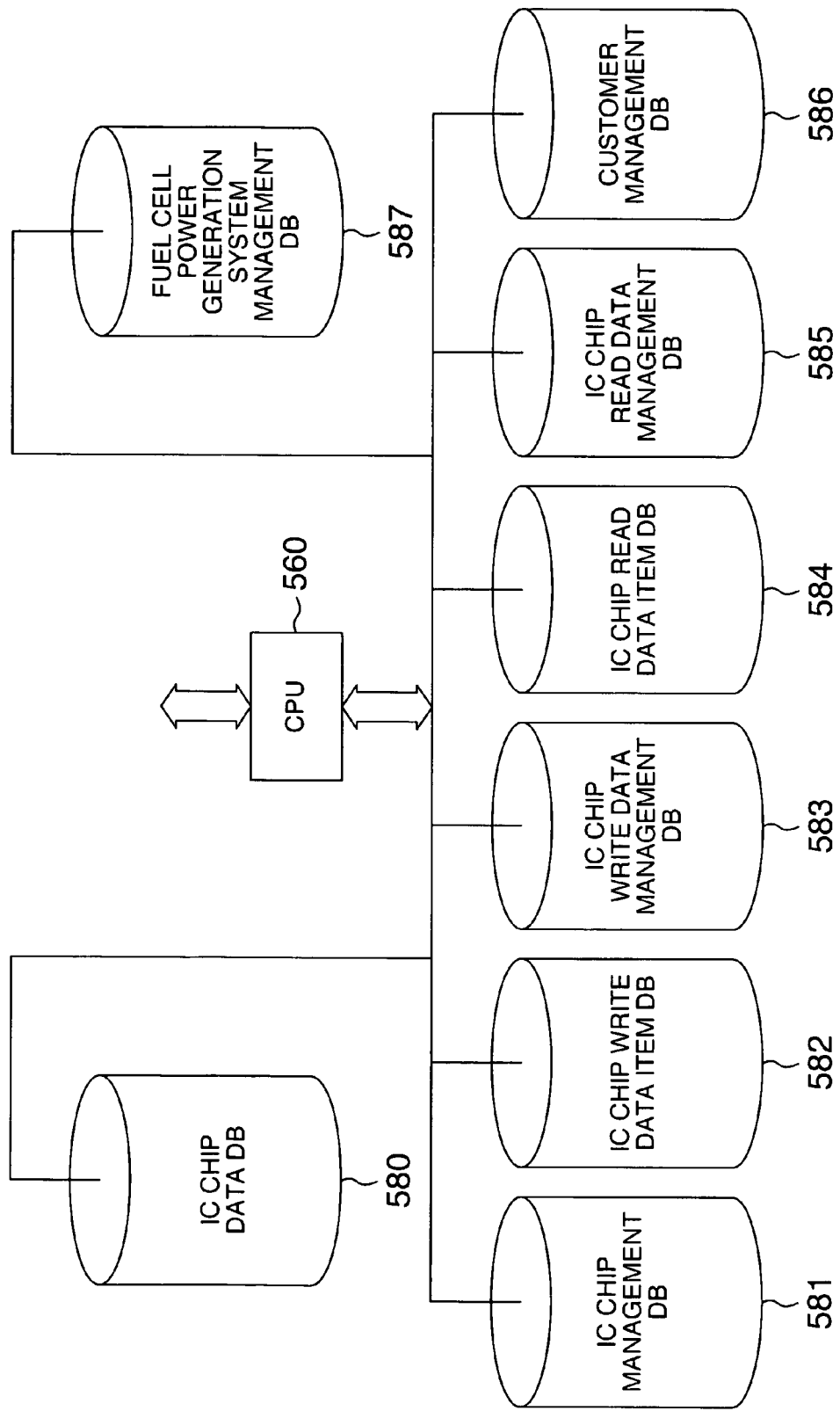
FIG. 5 is a diagram illustrative of management of memories (RAM's/ROM's) of IC chips based on databases.

The memory (RAM/ROM) 563 is managed by dint of databases (DB's) as shown in FIG. 5. The aforementioned memory areas correspond to the illustrated databases, respectively.

The I/O circuit 564 is connected to the menu selection circuit 566, write circuit 567, read circuit 568, memory (RAM/ROM) drive circuit 569 and input unit 57 and it inputs signals of these components to the CPU 560 and supplies signals delivered out of the CPU 560 to these components, respectively.

The menu selection circuit 566 responds to the menu switches 554 and 555 of read/write unit 550 to select the write menu in the selected write mode when the write switch 556 of read/write unit 550 is turned on or to select the read menu in the selected read mode when the read switch 557 of read/write unit 550 is turned on.

The write circuit 567 responds to the write switch 556 and with the write switch 556 turned on, sets the operating state of read/write unit 550 to the write mode so as to write the memory (RAM/ROM) 563 of read/write unit 550.

The read circuit 568 responds to the read switch 557 and with the read switch 557 turned on, sets the operating state of read/write unit 550 to the read mode so as to read the memory 563 of read/write unit 550.

With the write switch 556 or read switch 557 turned on, the memory (RAM/ROM) drive circuit 569 operates to write into the memory 563 data supplied from the input unit 570 or data stored in the memory section 410 of IC chip 402 and read out through the logical section 408.

The input unit 570 is connected to the input switch 559 and with the input switch 559 operated, writes data to the memory section 41 of IC chip 402 via the transmitter 561 under the control of the CPU 560. Data typed in by the input switch 559 is displayed on the display 552 by dint of the display driver 562 through the use of the input unit 570.

Figure 6:
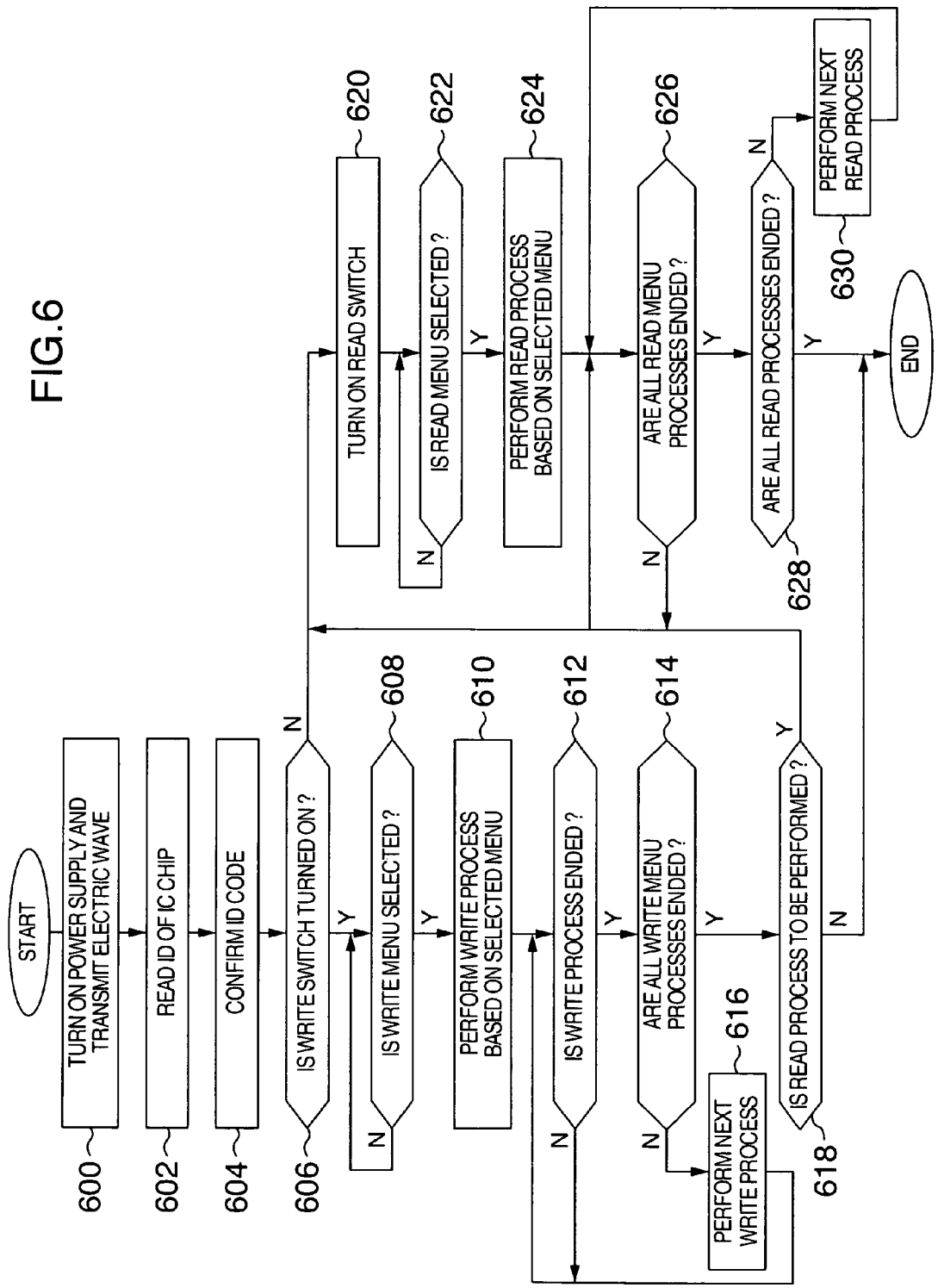
FIG. 6 is a flowchart illustrative of a method of reading/writing (R/W method) the wireless tag (RFID tag) having a system information memory area for the fuel cell power generation system.

Referring now to FIG. 6, an embodiment of a method of reading/writing a wireless tag (RFID tag) having a system information area for the fuel cell power generation system according to the invention. A flowchart shown in FIG. 6 is for explaining a process in which data in the memory section 410 of IC chip 402 is rewritten or data stored in the memory section 410 of IC chip 402 is read under the control of the CPU 560.

More particularly, in step 600, the power supply switch 553 of read/write unit (R/W unit) 550 is turned on to activate the power supply circuit 565 and the CPU 560 causes the transmitter 561 to transmit an electric wave via the antenna 551. With the electric wave transmitted in the step 600, the antenna section 404 of IC chip 402 receives the electric wave to start the IC chip 402. With the IC chip 402 started, the read/write unit 550 reads an ID code of the IC chip 402 in step 602. To describe reading of the ID code more specifically, when the electric wave is transmitted from the read/write unit 550, the IC chip 402 constituting a wireless tag receives at its antenna section 404 the electric wave which in turn is used to induce a power source by dint of the power supply section 406, the power source being capable of feeding overall circuits of the IC chip 402, so that the IC chip 402 can be ready for transmission/reception and it transmits through the logical section 408 the ID code read out of the memory section 410. The ID code transmitted from the memory section 410 via the logical section 408 of IC chip 402 is displayed on the display 552 of read/write unit 550.

With the ID code of IC chip 402 read in the step 602, the read/write unit 550 confirms the ID code of IC chip 402 displayed on the display 552 in step 604. After completion of the confirmation of the ID code of IC chip 402 in the step 604, it is decided in step 606 whether the write switch 556 of read/write unit 550 is turned on. In other words, operation to be done by the read/write unit 550 is decided as to whether to be for read. With the write switch 556 of read/write unit 550 determined as being turned on in the step 606, it is decided in step 608 whether a write menu is selected by using the menu switches 554 and 555 of read/write unit 550. In other words, write data is decided as to whether to be management data (ID code No) for specifying the IC chip 402, data for specifying a manufacture maker, data for specifying a manufacture factory of the device, data for specifying a manufacture date or data for specifying individual products of devices.

With any write menu determined to be selected in the step 608 by means of the menu switches 554 and 555 of read/write unit 550, a write process based on the selected menu (ID code No, data for specifying a manufacture maker, data for specifying a manufacture factory of the device, data for specifying a manufacture date or data for specifying individual device products) is carried out in step 610. After completion of the process for writing the menu selected by means of the menu switches 554 and 555 in the step 610, the program proceeds to step 612 in which it is decided whether the write process of the menu selected by the menu switches 554 and 555 ends. If the write process of the menu selected by the menu switches 554 and 555 is determined as being ended in the step 612, it is decided in step 614 whether write processes of all menus in write processing end. Unless the write processes of all menus in write processing are ended, the program proceeds to step 616 in which a process for writing the next menu is carried out and then the program returns to the step 612.

With the write processes of all menus in write processing determined to be ended in the step 614, it is decided in step 618 whether a read process is to be executed. If in the step 618 the read process is so determined as not to be executed, the flow ends.

If the read process is determined as being executed in the step 618, the program proceeds to step 620 in which the read switch 557 of read/write unit 550 is turned on. With the read switch 557 of read/write unit 550 turned on in the step 620, the program proceeds to step 622 in which it is decided whether a read menu is selected by means of the menu switches 554 and 555 of read/write unit 550.

If in the step 622 any read menu is determined as being selected by the menu switches 554 and 555 of read/write unit 550, a data read process based on the selected menu is carried out in step 624. With the read process of the menu selected by the menu switches 554 and 555 executed in the step 624, it is decided in step 626 whether the read process of the menu selected by the menu switches 554 and 555 ends. With the read process of the menu selected by the menu switches 554 and 555 determined as being ended in the step 626, the program proceeds to step 628 in which it is decided whether read processes of all menus in read processing end. Unless the read processes of all menus in read processing are determined as being ended in the step 628, a read process of the next menu is carried out in step 630 and the program returns to the step 626. If the read processes of all menus are determined as being ended, this flow ends.

Figure 7:
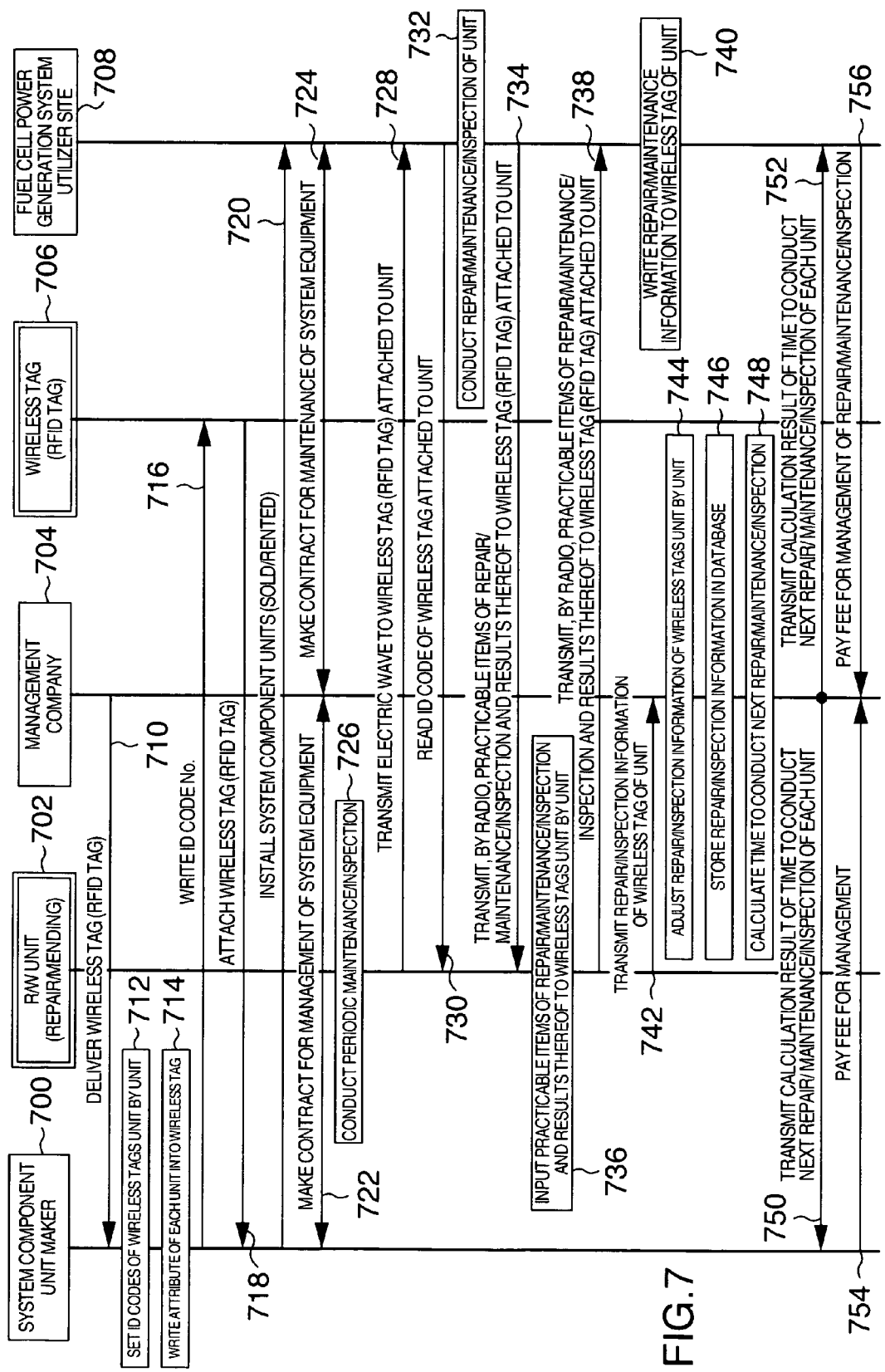
FIG. 7 is a chart useful to explain the transmission/reception relation of data among a management company, a read/write unit (R/W unit) and a wireless tag (RFID tag) when a utilizer of a fuel cell power generation system purchases individual component units constituting the fuel cell power generation system from a system component unit maker.

When a maker 700 selling individual component units constituting a fuel cell power generation system possesses a read/write unit (R/W unit) 702 and attaches an IC chip 402 constituting a wireless tag (RFID tag) to a unit, the relation of data transmission/reception is set up between the read/write unit 702 and the IC chip 402 constituting a wireless tag 706 as shown in FIG. 7.

In FIG. 7, the system component unit maker 700 is a trader manufacturing and selling individual units constituting a fuel cell power generation system 1 (fuel cell device 2, material feed unit 3, fuel reform unit 4, fuel cell stack unit 5, cooling water supply unit 6, control unit 7, nitrogen gas supplier 8, exhaust heat collector 11, pretreatment section 41, reformer 42, heater 43, CO shift converter 44, CO remover 45, water treatment section 61, circulating water tank 62, heat exchanger 63, air blowers B1 to B4, pumps W1 and W2 and breaker valves V1 to V5). The system component unit maker 700 is a general term of traders undertaking repairs and mending on the individual units as above and incorporates an electric construction work dealer, a gas fitting work dealer, a waterworks dealer and a system plant dealer. In repairing and mending each component unit, the system component unit maker 700 carries the R/W unit 702 for repair/mending indispensable for writing repair/mending contents into the wireless tag (RFID tag) 706 attached to a unit undergoing repair/mending.

The repair/mending R/W unit 702 functions to read pieces of attribute information of the individual units constituting the fuel cell power generation system (information for specifying a manufacture maker, information for specifying an installation trader, information for specifying a manufacture date, information for specifying individual products of units, characteristic information of unit, specification information of unit, durable period of unit, periodic inspection cycle information and the like), the attribute information being written to a wireless tag 706 constructed of the IC chip 402 mounted to each unit. The repair/mending R/W unit 702 also functions to write contents of periodic inspection/repair/mending obtained when performing periodic inspection/repair/mending of each unit constituting the fuel cell power generation system and the status of each component unit specified by the periodic inspection/repair/mending to the REIF tag (wireless tag) and to read the thus written information.

Denoted by 704 is a dealer or management company engaged in management of the aforementioned individual units constituting the fuel cell power generation system.

The system component unit maker 700 purchases the wireless tags (RFID tags) 706 from a RFID tag (wireless tag) manufacture maker (management company 704) or a RFID tag (wireless tag) sales maker (management company 704) (710). The thus purchased wireless tag or tags 706 are attached to the fuel cell power generation system 1 or to the individual units constituting the fuel cell power generation system 1. Generally, a wireless tag called IC tag or electronic tag may be used.

A fuel cell power generation system utilizer 708 buys the aforementioned units constituting the fuel cell power generation system from the system component unit maker 700 and is engaged in fuel cell power generation by using the fuel cell power generation system 1 (for domestic use on the one hand and for business service use on the other hand).

In the system component unit maker 700, the wireless tag (RFID tag) 706 delivered from the management company 704 is set with an ID code No representing a code specific to that wireless tag (712). Alternatively, at the time the utilizer 708 purchases the wireless tags (RFID tags) 706 from the wireless tag (RFID tag) manufacture maker (management company), the wireless tag (RFID tag) manufacture maker (management company) may write ID code Nos. to individual wireless tags in advance. In the system component unit maker 700, the wireless tag (RFID tag) 706 written with the ID code No is further written with the attribute information of each unit constituting the fuel cell power generation system (714). The attribute information of each unit may be written after the wireless tag (RFID tag) 706 written with ID code No has been attached to each unit (716). In this manner, wireless tags (RFID tags) 706 respectively written with ID code Nos. and pieces of attribute information of the individual units are mounted to the individual units (718).

The fuel cell power generation system 1 and the individual units constituting the fuel cell electric power generation system mounted with the wireless tags (RFID tags) 706 in this manner are sold or rented so as to be installed in a house or building of the fuel cell electric power generation system utilizer 708 (720).

Under this condition, the management company 704 makes a contract with the system component unit maker 700 for management of the system equipment (fuel cell power generation system 1 and individual units constituting the fuel cell power generation system which are mounted with the wireless tags (RFID tags) 706) (722). Similarly, the management company 704 makes a contract with the fuel cell power generation system utilizer 708 for maintenance/management of the system equipment (fuel cell power generation system 1 and individual units constituting the fuel cell power generation system which are mounted with the wireless tags (RFID tags) 706) (724).

Under this condition, the management company 704 conducts periodical maintenance/inspection of the system equipment (fuel cell power generation system 1 and individual units constituting the fuel cell power generation system which are mounted with the wireless tags (RFID tags) 706) delivered to the fuel cell power generation system utilizer 708 (726). In the periodic maintenance/inspection, confirmation of status of the system equipment, cleaning for assuring normal operation state and repair and mending (exchange of deteriorated parts) are carried out.

In the course of the periodic maintenance/inspection, an electric wave is first transmitted from the repair/mending (R/W) unit 702 to the antenna section 404 of IC chip 402 of a wireless tag (RFID tag) 706 attached to the system equipment (728). The logical section 408 follows a command transmitted from the R/W unit to execute a process (for example, for reading various kinds of information stored in the memory section 410) (730).

Various kinds of information stored in the memory section 410 of the wireless tag (RFID tag) 706 are read to confirm the system equipment subject to the periodic maintenance/inspection and the repair/maintenance/inspection of the system equipment is then carried out (732). The system equipment is sometimes repaired on the basis of a request for repairs on failure made by the fuel cell power generation system utilizer 708 and this case is also dealt with in a way similar to the periodic maintenance/inspection.

In the repair/maintenance inspection of the system equipment, a person in charge of repair/maintenance inspection carries a read/write unit 550 of handy type and uses the handy type read/write unit 550 to select the write switch 556, set the write mode for writing data in the memory section 410 via the antenna section 404 and logical section 408 of IC chip 402 and transmit practicable items of periodic maintenance/inspection and results of the periodic maintenance/inspection to the wireless tag (RFID tag) 706 so as to write them into the memory section 410 of wireless tag (RFID tag) 706 (734).

After having transmitted the practicable items of periodic maintenance/inspection and the results of the periodic maintenance/inspection to the wireless tag 706 and written them into the memory section 410 of wireless tag (RFID tag) 706 by using the handy type read/write unit 550, the person conducting repair/maintenance/inspection inputs practicable items of repair/maintenance/inspection and the results of periodic maintenance/inspection which are to be written to the wireless tag (RFID tag) 706 attached to each unit by using the portable handy type read/write unit 550 (736). The practicable items of periodic maintenance/inspection and the results of periodic maintenance/inspection, which items and results are fetched to the handy type read/write unit 550, are transmitted to the wireless tag (RFID tag) 706 attached to each unit (738).

In the fuel cell power generation system utilizer site 708, the practicable items of periodic maintenance/inspection and the results of periodic maintenance/inspection are written to the memory section 410 of the wireless tag (RFID tag) 706 attached to the system equipment (740). With the practicable items of periodic maintenance/inspection and the results of periodic maintenance/inspection written to the memory section 410 of wireless tag (RFID tag) 706, the practicable items of periodic maintenance/inspection and the results of periodic maintenance/inspection which have been written to the wireless tag (RFID tag) 706 attached to the system equipment are transmitted from the handy type read/write unit 550 to the management company 704 through the use of a radio device (742).

In the management company 704, the practicable items of periodic maintenance/inspection and the results of periodic maintenance/inspection, which items and results are written in the memory section 410 of the wireless tag (RFID) 706 attached to the system equipment, are managed or adjusted in accordance with individual contents of repairs and individual contents of maintenance (744). Further, in the management company 704, the practicable items of periodic maintenance/inspection and the results of periodic maintenance/inspection which are written in the memory section 410 of the wireless tag (RFID tag) 706 attached to the system equipment are stored in various kinds of databases shown in FIG. 5 in accordance with the individual units, individual contents of repairs and individual contents of maintenance (746).

Then, in the management company 704, the time to conduct the next maintenance/inspection is calculated on the basis of the practicable items of periodic maintenance/inspection and the results of periodic maintenance/inspection which are written to the wireless tag (RFID tag) 706 attached to the system equipment (748). The calculation of the time to conduct the next maintenance/inspection is carried out in the case that the system equipment is repaired because of its failure, that the degree of degradation of characteristics is aggravated in a shorter period than that predicted initially or that the use environment of the system equipment is more severely conditioned than usual (as exemplified by a salt injury region or a high-temperature/high-humidity region), in short, in the event that normal operation of the system equipment cannot afford to be assured in the normal cycle of periodic maintenance/inspection and therefore cycles different from that of normal periodic maintenance/inspection are set in accordance with various kinds of conditions.

When having calculated the cycle of the time to conduct the next maintenance/inspection of the system equipment on the basis of the practicable items of periodic maintenance/inspection and the results of periodic maintenance/inspection which are written in the wireless tag (RFID tag) 706 attached to the system equipment, the management company 704 transmits the results of times to conduct calculation of the repair/maintenance/inspection for the individual units to the system component unit maker 700 (repair/mending (R/W unit)702) (750). Concurrently with the transmission to the system component unit maker 700, the management company 704 transmits the calculation results of the times to conduct repair/maintenance/inspection for the individual units to the fuel cell power generation system utilizer 708.

In this manner, the system component unit maker 700 and fuel cell power generation system utilizer 708 can know from the management company 704 the status of the system equipment on the basis of the practicable items of periodic maintenance/inspection and the results of periodic maintenance/inspection of the system equipment and can receive service offered to prevent the occurrence of troubles or accidents in advance. In compensation for this service by the management company 704, the system component unit maker 700 pays a management fee (754). In compensation for the service by the management company 704, the fuel cell power generation system utilizer 708 also pays to the management company 704 a fee for management of repair/maintenance/inspection (756).

Figure 8:
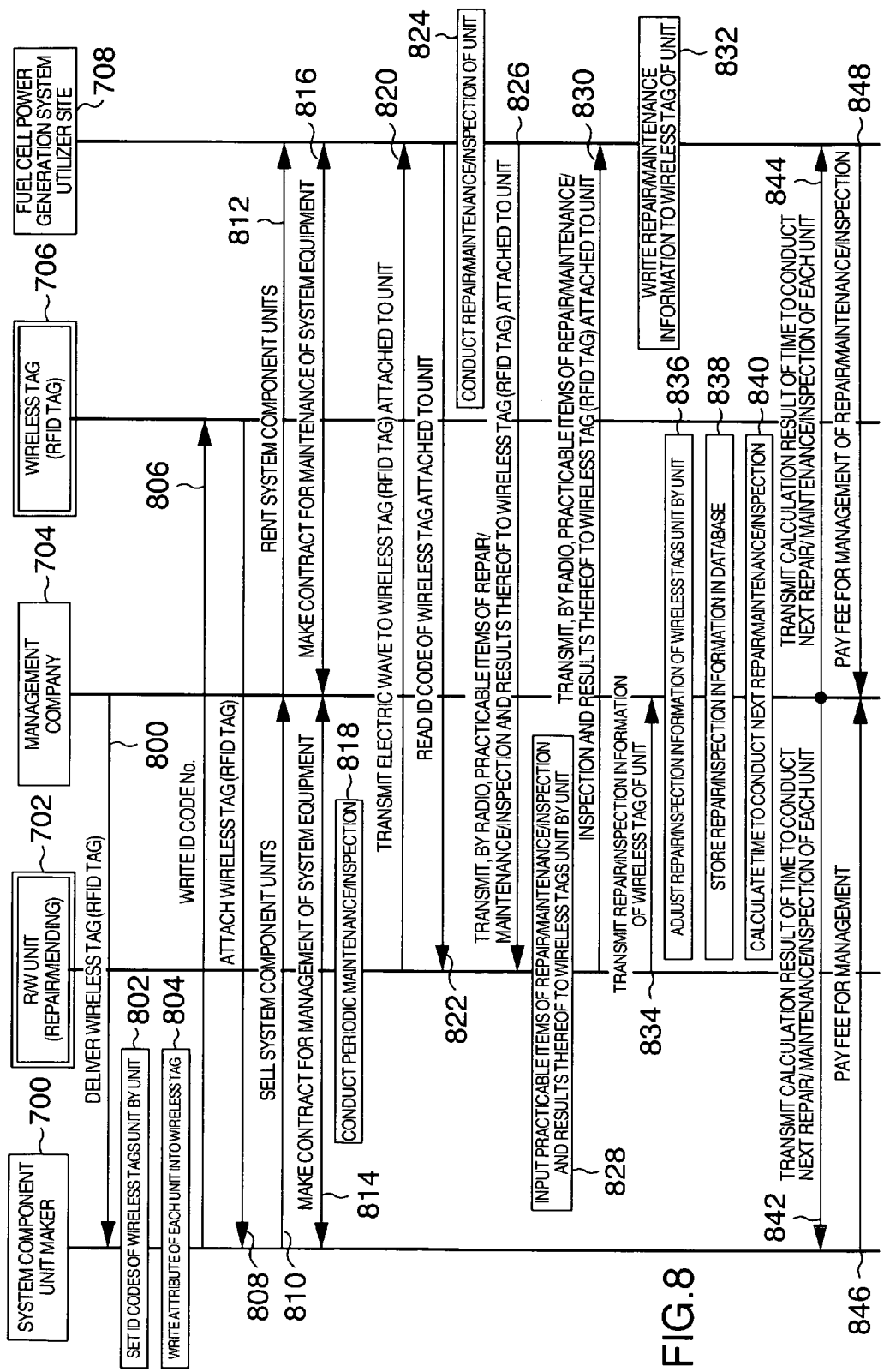
FIG. 8 is a chart useful to explain the transmission/reception relation of data among the management company, read/write unit and wireless tag when a fuel cell power generation system utilizer rents the individual component units constituting the fuel cell power generation system from the management company.

Another example of the relation of transmission/reception of data between the read/write unit (R/W unit) 702 and the IC chip 402 constituting the wireless tag (RFID tag) 706 established when the maker 700 selling individual units constituting the fuel cell power generation system has the read/write unit (R/W unit) 550 and attaches the IC chip 402 constituting the wireless tag (RFID tag) to the unit is illustrated in FIG. 8.

In the present embodiment, the fuel cell power generation system 1 attached with the wireless tag (RFID tag) 706 and the individual units constituting the fuel cell power generation system and also attached with the wireless tags are sold not to the fuel cell power generation system utilizer 708 representing an end user but to the management company 704 engaged in management of the individual units (810). The management company 704 having purchased from the system component unit maker 700 the fuel cell power generation system 1 and the individual units constituting the fuel cell power generation system rents the fuel cell power generation system and its component units to the fuel cell power generation system utilizer 708 representing an end user (812). Then, the fuel cell power generation system 1 and its component units are installed in a house or building of the fuel cell power generation system utilizer 708 in the name of rent or for rent.

Under this condition, the management company 704 makes a contract with the system component unit maker 700 for management of the system equipment (814). Similarly, the management company 704 makes a contract with the fuel cell power generation system utilizer 708 for maintenance (maintenance management) of the system equipment for rent (816).

The remaining procedures can be executed comparably to those in FIG. 7.

According to this embodiment, the fuel cell power generation system can be operated constantly in the best condition.

Also, according to the present embodiment, the status inclusive of degradation of characteristics of the system equipment used in the fuel cell power generation system can be grasped steadily and accurately and operation stoppage due to abnormality of the fuel cell power generation system can be prevented from occurring.

Further, according to the present embodiment, even when a plurality of traders including a trader offering materials, a trader undertaking waterworks for hot water reserve and supply, an electric power trader for an electric system, a fuel reformer trader and a manufacturer of fuel cell stack are concerned, the management company manages the fuel cell device jurisdictionally to facilitate its total maintenance.

Figure 9A:
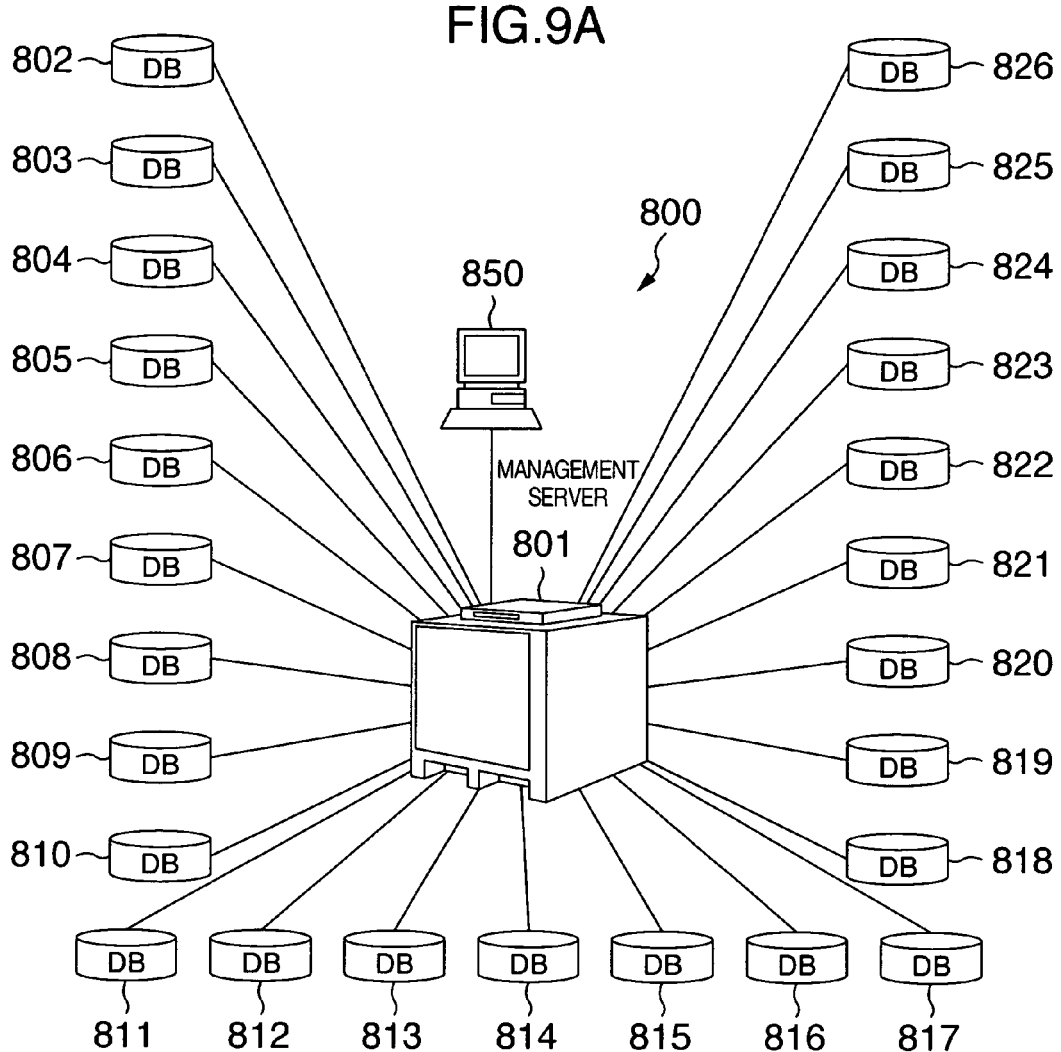
FIG. 9A is a diagram showing a configuration of a processing apparatus of the management company from which the fuel cell power generation system utilizer buys or rents the individual units constituting the fuel cell power generation system in accordance with FIG. 7 or 8.

Referring to FIG. 9A, there is illustrated a processing system 800 the management company 704 selling individual units constituting the fuel cell electric power generation system (in some case, the maker 700 having the read/write unit 550 substitutes for the management company 704) has. The processing system 800 includes a management server 801. The management server 801 is connected with a main computer 850.

Figure 9B:
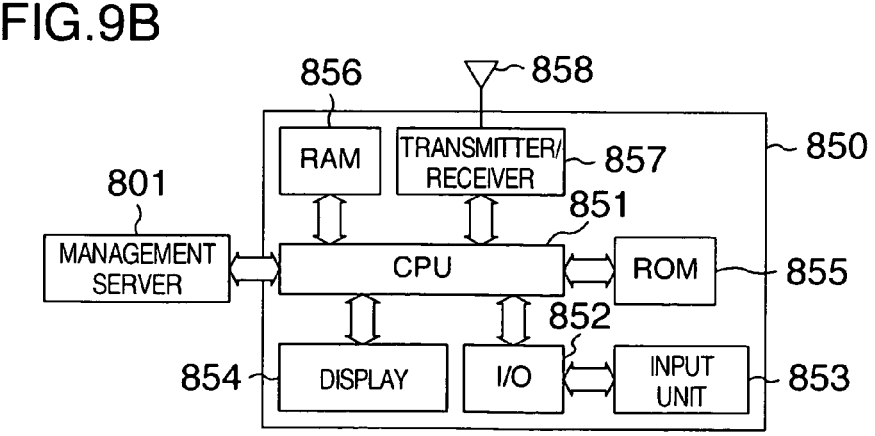
FIG. 9B is a block diagram showing the construction of a main computer.

The main computer 850 is constructed as illustrated in FIG. 9B. More particularly, the main computer 850 has a CPU 851 to which an I/O (input/output) circuit 852, a display 854, a ROM 855, a RAM 856 and a transmitter/receiver 857 are coupled through bus lines. The transmitter/receiver 857 is connected with an antenna 858 so as to be able to perform transmission/reception to/from an external communication apparatus. The CPU 851 is also coupled with the management server 801 through a bus line. The I/O circuit 852 is coupled with an input unit 853.

The main computer 850 operates to write various kinds of input data into various databases connected to the management server 801, respond to a request from the outside to read and deliver various kinds of data written in the various databases or receive various kinds of data transmitted through the medium of the transmitter 561 of handy type read/write unit 550 to write them into the various databases. In addition, the CPU 851 carries out a process for transmitting alarm on the basis of various kinds of data placed in condition requiring precedent maintenance (for example, detection of abnormal state of equipment, lapse of use available period or arrival of time to conduct periodic inspection).

A customer database 802 stores and holds various kinds of personal information of a house or building in which a fuel cell power generation system is installed, for example, data of address, name, age, telephone number, place of employment (profession), structure of building (wooden house or reinforced ferro-concrete building), kind of building (detached house or two-family house), total area of structure, family make-up, contract demand, location conditions of structure (seaside, mountainous district or the like), and environment of structure (dry ground district, damp ground district).

A fuel cell component manufacture maker database 803 stores and holds data including information of traders manufacturing and selling individual units constituting a fuel cell device, for example, address, name, representative, telephone number, established date, capital, category of business concerned, correspondent bank and payment conditions. The database 803 may also store and hold information of traders undertaking repair/mending of the individual units constituting the fuel cell device (electric construction work dealer, gas fitting work dealer, waterworks dealer, system plant dealer and the like).

An IC chip database 804 stores and holds various kinds of data pieces of all IC chips (RFID tags (wireless tags) 412 attached to the fuel cell device constituting the fuel cell power generation system in respect of the individual IC chips. More specifically, information as to which customer the used IC chip 412 belongs to and information as to which manufacture maker the fuel cell power generation system mounted with the IC chip belongs to are stored and held. It can be known from the IC chip database 804 which one of customers the fuel cell device attached with the used IC chip 412 belongs to and which part of the fuel cell device constituting the fuel cell power generation system the used IC chip 412 is located at.

A fuel cell device maintenance process database 805 stores and holds practicable items of periodic maintenance/inspection, time to conduct the periodic maintenance/inspection and evaluation criterion for results of periodic maintenance/inspection as well as information concerning maintenance/inspection contents and repair/mending contents for the fuel cell device 2 which is written in the IC chip 402 attached to a main console of the fuel cell device 2 installed in a customer's house or building. The IC chip 402 is stored with information concerning maintenance/inspection contents and repair/mending contents when the fuel cell device 2 undergoes maintenance/inspection and repair/mending.

A material feed unit maintenance process database 806 stores and holds practicable items of periodic maintenance/inspection, time to conduct the periodic maintenance/inspection and evaluation criterion of the results of periodic maintenance/inspection as well as information concerning maintenance/inspection contents and repair/mending contents for the material feed unit 3 which is written in the IC chip 402 attached to a main console of the material feed unit 3 constituting the fuel cell device 2 installed in the customer's house or building. The IC chip 402 is stored with information concerning maintenance/inspection contents and repair/mending contents when the material feed unit 3 undergoes maintenance/inspection and repair/mending.

A fuel supply piping system maintenance process database 807 stores practicable items of periodic maintenance/inspection, time to conduct the periodic maintenance/inspection and evaluation criterion of the results of periodic maintenance/inspection as well as information concerning maintenance/inspection contents and repair/mending contents when a trader (gas fitting work dealer) carries out maintenance of the fuel supply piping system.

A fuel reform unit maintenance process database 808 stores practicable items of periodic maintenance/inspection, time to conduct the periodic maintenance/inspection and evaluation criterion of the results of periodic maintenance/inspection as well as information concerning maintenance/inspection contents and repair/mending contents when a trader of fuel reform unit 4 (manufacturer of fuel reform unit 4) carries out maintenance of the fuel reform unit 4.

A fuel cell stack maintenance process database 809 stores practicable items of periodic maintenance/inspection, time to conduct the periodic maintenance/inspection and evaluation criterion of the results of periodic maintenance/inspection as well as information concerning maintenance/inspection contents and repair/mending contents when a trader of fuel cell stack unit 5 (manufacturer of fuel cell stack unit 5) carries out maintenance of the fuel cell stack unit 5.

A fuel electrode maintenance process database 810 stores practicable items of periodic maintenance/inspection, time to conduct the periodic maintenance/inspection and evaluation criterion of the results of periodic maintenance/inspection as well as information concerning maintenance/inspection contents and repair/mending contents when a trader of fuel electrode 51 of the fuel cell stack unit 5 (manufacturer of fuel cell stack unit 5) carries out maintenance of the fuel electrode 51 of fuel cell stack unit 5.

An air electrode maintenance process database 811 stores information concerning maintenance/inspection contents and repair/mending contents when a trader of air electrode 52 of the fuel cell stack unit 5 (manufacturer of fuel cell stack unit 5) carries out maintenance of the air electrode 52 of fuel cell stack unit 5.

A cooler maintenance process database 812 stores practicable items of periodic maintenance/inspection, time to conduct the periodic maintenance/inspection and evaluation criterion of the results of periodic maintenance/inspection as well as information concerning maintenance/inspection contents and repair/mending contents when a trader of cooler section 53 of the fuel cell stack unit 5 (manufacturer of fuel cell stack unit 5) carries out maintenance of the cooler section 53 of fuel cell stack unit 5.

A cooling water supply unit maintenance process database 813 stores practicable items of periodic maintenance/inspection, time to conduct the periodic maintenance/inspection and evaluation criterion of the results of periodic maintenance/inspection as well as information concerning maintenance/inspection contents and repair/mending contents when a trader of the cooling water supply unit 6 (manufacturer of cooling water supply unit 6 or waterworks dealer) carries out maintenance of the cooling water supply unit 6.

A control unit maintenance process database 814 stores practicable items of periodic maintenance/inspection, time to conduct the periodic maintenance/inspection and evaluation criterion of the results of periodic maintenance/inspection as well as information concerning maintenance/inspection contents and repair/mending contents when a trader of control unit 7 (manufacturer of control unit 7 or electric construction work dealer) carries out maintenance of the control unit 7.

An electric system maintenance process database 815 stores practicable items of periodic maintenance/inspection, time to conduct the periodic maintenance/inspection and evaluation criterion of the results of periodic maintenance/inspection as well as information concerning maintenance/inspection contents and repair/mending contents when a trader of electric system (electric construction work dealer) carries out maintenance of the electric system.

In the case of a system using the nitrogen gas feeder, a nitrogen gas feeder maintenance process database 816 stores practicable items of periodic maintenance/inspection, time to conduct the periodic maintenance/inspection and evaluation criterion of the results of periodic maintenance/inspection as well as information concerning maintenance/inspection contents and repair/mending contents when a trader of nitrogen gas feeder 8 (manufacturer of nitrogen gas feeder 8 or gas fitting work dealer) carries out maintenance of the nitrogen gas feeder 8.

An exhaust heat collector maintenance process database 817 stores practicable items of periodic maintenance/inspection, time to conduct the periodic maintenance/inspection and evaluation criterion of the results of periodic maintenance/inspection as well as information concerning maintenance/inspection contents and repair/mending contents when a trader of the exhaust heat collector 11 (manufacturer of exhaust heat collector 11) carries out maintenance of the exhaust heat collector 11.

A pretreatment section maintenance process database 818 stores practicable items of periodic maintenance/inspection, time to conduct the periodic maintenance/inspection and evaluation criterion of the results of periodic maintenance/inspection as well as information concerning maintenance/inspection contents and repair/mending contents when a trader of the pretreatment section 41 (manufacturer of pretreatment section unit 41) carries out maintenance of the pretreatment section 41.

A reformer maintenance process database 819 stores practicable items of periodic maintenance/inspection, time to conduct the periodic maintenance/inspection and evaluation criterion of the results of periodic maintenance/inspection as well as information concerning maintenance/inspection contents and repair/mending contents when a trader of the reformer 42 (manufacturer of reformer 42) carries out maintenance of the reformer 42.

A heater maintenance process database 820 stores practicable items of periodic maintenance/inspection, time to conduct the periodic maintenance/inspection and evaluation criterion of the results of periodic maintenance/inspection as well as information concerning maintenance/inspection contents and repair/mending contents when a trader of the heater 43 (manufacturer of heater 43) carries out maintenance of the heater 43.

A CO shift converter maintenance process database 821 stores practicable items of periodic maintenance/inspection, time to conduct the periodic maintenance/inspection and evaluation criterion of the results of periodic maintenance/inspection as well as information concerning maintenance/inspection contents and repair/mending contents when a trader of the CO shift converter 44 (manufacturer of CO shift converter 44) carried out maintenance of the CO shift converter 44.

A CO remover maintenance process database 822 stores practicable items of periodic maintenance/inspection, time to conduct the periodic maintenance/inspection and evaluation criterion of the results of periodic maintenance/inspection as well as information concerning maintenance/inspection contents and repair/mending contents when a trader of the CO remover 45 (manufacturer of CO remover 45) carries out maintenance of the CO remover 45.

A water treatment section maintenance process database 823 stores practicable items of periodic maintenance/inspection, time to conduct the periodic maintenance/inspection and evaluation criterion of the results of periodic maintenance/inspection as well as information concerning maintenance/inspection contents and repair/mending contents when a trader of the water treatment section 61 (manufacturer of water treatment section 61, waterworks dealer or system plant dealer) carries out maintenance of the water treatment section 61.

A circulating water tank maintenance process database 824 stores practicable items of periodic maintenance/inspection, time to conduct the periodic maintenance/inspection and evaluation criterion of the results of periodic maintenance/inspection as well as information concerning maintenance/inspection contents and repair/mending contents when a trader of the circulating water tank 62 (manufacturer of circulating water tank 62, waterworks dealer or system plant dealer) carries out maintenance of the circulating water tank 62.

A distributing pipe system maintenance process database 825 stores practicable items of periodic maintenance/inspection, time to conduct the periodic maintenance/inspection and evaluation criterion of the results of periodic maintenance/inspection as well as information concerning maintenance/inspection contents and repair/mending contents when a trader of the distributing pipe system (waterworks dealer or system plant dealer) carries out maintenance of the distributing pipe system.

A database 826 for maintenance process of the external appearance of fuel cell power generation system stores practicable items of periodic maintenance/inspection, time to conduct the periodic maintenance/inspection and evaluation criterion of the results of periodic maintenance/inspection as well as information concerning maintenance/inspection contents and repair/mending contents when a trader of the fuel cell power generation system (system plant dealer) carries out maintenance of the external appearance of fuel cell power generation system.

The processor 800 fetches the results of periodic maintenance/inspection written in the memory section 410 of the wireless tag (RFID tag) 706 attached to the system equipment (fuel cell power generation system 1 and individual component units constituting the fuel cell power generation system) after completion of the periodic maintenance/inspection and in the event that the normal operation state of the system equipment cannot be assured in the normal cycle of periodic maintenance/inspection, for example, in the case that the system equipment (fuel cell power generation system 1 and individual units constituting the fuel cell power generation system) becomes faulty and is repaired, that the degree of degradation of characteristics is aggravated in a shorter time than that initially predicted or that the use environment of the system equipment is severer than usual (salt injury district or high temperature/highly damp district), the processor 800 calculates a cycle different from that of normal periodic maintenance/inspection in accordance with various kinds of conditions and sets the calculated cycle.

After the processor 800 has calculated the cycle of time to conduct the next maintenance/inspection of the system equipment on the basis of the practicable items of periodic maintenance/inspection and the results of periodic maintenance/inspection which are written in the wireless tag (RFID tag) 706 attached to the system equipment, the management company 704 transmits the calculation results of calculated times to conduct repair/maintenance/inspection for the individual units to the system component unit maker 700 (repair/mending (R/W unit) 702) by using the transmitter/receiver 857 of main computer 850 of the processor 800. Concurrently with the transmission to the system component unit maker 700, the management company 704 transmits the calculation results of the times to conduct repair/maintenance/inspection for the individual units to the fuel cell power generation system utilizer (consumer) 708.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A fuel cell device having a material feed unit for feeding fuel of hydrocarbon system, a fuel reform unit for creating hydrogen from the material fed from said material feed unit and supplying the hydrogen, a fuel cell stack unit for generating power from the hydrogen fed from said fuel reform unit and air, a cooling water supply unit for supplying cooling water to said fuel cell stack unit to control its temperature in order for said fuel cell stack unit to generate electric power stably and a control unit for controlling output power generated from said fuel cell stack unit in compliance with use purposes, said device comprising memory means for storing information necessary for maintenance or inspection of said fuel cell device,
wherein said memory means includes a rewritable memory and stores information internal of said memory in a partitive memory area comprised of a use environment information memory area for storing use environment conditions, a material feed information memory area for storing attribute information of said material feed unit, a fuel reform information memory area for storing attribute information of said fuel reform unit, a cell stack information memory area for storing attribute information of said fuel cell stack unit and a cooling water supply information memory area for storing attribute information of said cooling water supply unit.

2. A fuel cell device having a material feed unit for feeding fuel of hydrocarbon, a fuel reform unit for creating hydrogen from the material fed from said material feed unit, a fuel cell stack unit for generating electric power from the hydrogen fed from said fuel reform unit and air, a cooling water supply unit for supplying cooling water to said fuel cell stack unit to control its temperature in order for said fuel cell stack unit to generate electric power stably and a control unit for controlling output power generated from said fuel cell stack unit in compliance with use purposes, said device comprising memory means for storing information necessary for maintenance or inspection of said fuel cell device,
wherein said memory means includes a rewritable memory in which information stored in said memory is obtainable or accessible externally and information acquired externally is written into said memory by means of a wireless tag, so that attribute information of each of said units can be acquired or accessed externally.

3. A fuel cell device according to claim 2, wherein said wireless tag is attached to said fuel cell device.

4. A fuel cell device according to claim 2, wherein said material feed unit, fuel reform unit, fuel cell stack unit, cooling water supply unit and control unit are housed in a casing of said fuel cell device and said wireless tag is attached to said casing.

5. A fuel cell device according to claim 2, wherein wireless tags are attached separately to one or more of said material feed unit, fuel reform unit, fuel cell stack unit, cooling water supply unit and control unit, respectively.

6. A fuel cell device according to claim 5, wherein said fuel reform unit of fuel cell device includes a pretreatment section for removing a specified ingredient of the material fed from said material feed unit.

7. A fuel cell device according to claim 1, wherein said use environment information memory area for storing use environment conditions includes a memory area for storage of information for specifying geographical environment conditions in which said fuel cell device is installed, a memory area for storage of information for specifying meteorological environment conditions in which said fuel cell device is installed and a memory area for storage of information for specifying physical conditions in which said fuel cell is installed.

8. A fuel cell device according to claim 1, wherein said material feed information memory area for storing attribute information of said material feed unit includes a memory area for storage of information for specifying at least the kind of material, a memory area for storage of information for specifying an ingredient contained in the material, a memory area for storage of information for specifying a maximum feed volume of material per unit time, a memory area for storage of information for specifying a manufacture company of said material feed unit, a memory area for storage of information for specifying a manufacture date of said material feed unit and a memory area for storage of information for specifying individual products of material feed units.

9. A fuel cell device according to claim 1, wherein said fuel reform unit includes a reformer for separating hydrogen through an endothermic reaction by using the material fed from said material feed unit and oxygen and generating heat, a heater for supplying heat to be used in the endothermic reaction to said reformer, a CO shift converter for reducing, through a shift equilibrium reaction, the concentration of CO created in said reformer and a CO remover for removing through oxidization the CO created in said reformer.

10. A fuel cell device according to claim 1, wherein said fuel reform information memory area for storing attribute information of said fuel reform unit includes a memory area for storage of information for specifying at least the ability to reform material said fuel reform unit has, a memory area for storage of information for specifying a manufacture company of said fuel reform unit, a memory area for storage of information for specifying a manufacture date of said fuel reform unit and a memory area for storage of information for specifying individual products of fuel reform units.

11. A fuel cell device according to claim 9, wherein wireless tags are separately attached to one or two or more of said reformer, heater, CO shift converter and CO remover.

12. A fuel cell device according to claim 1, wherein pieces of information in a wireless tag for said fuel reform unit are stored in a rewritable memory having a reformer information memory area for storing attribute information of said reformer, a heat information memory area for storing attribute information of said heater, a CO transform information memory area for storing attribute information of said CO shift converter and a CO removal information memory area for storing attribute information of said CO remover and they can be acquired or accessed externally.

13. A fuel cell device according to claim 1, wherein said cell stack information memory area for storing attribute information of said fuel cell stack unit includes a memory area for storage of information specifying at least the ability to generate electric power said fuel cell stack unit has, a memory area for storage of information for specifying a manufacture company of said fuel cell stack unit, a memory area for storage of information for specifying a manufacture date of said fuel cell stack unit and a memory area for storage of information for specifying individual products of fuel cell stack units.

14. A fuel cell device according to claim 1, wherein said fuel cell stack unit includes a fuel electrode for separating hydrogen fuel into hydrogen ions and electrons, an air electrode for reacting oxygen, electrons and hydrogen ions to create water and cooling means for controlling temperature of the whole of unit with pure water.

15. A fuel cell device according to claim 1, wherein said cooling water supply information memory area for storing attribute information of said cooling water supply unit includes a memory area for storage of information for specifying at least the kind of cooling water, a memory area for storage of information for specifying a maximum supply amount of cooling water per unit time, a memory area for storage of information for specifying a manufacture company of said cooling water supply unit, a memory area for storage of information for specifying a manufacture date of said cooling water supply unit, a memory area for storage of information for specifying individual products of cooling water supply units and a memory area for storage of information for specifying time to conduct water treatment maintenance of said cooling water supply unit.

16. A fuel cell device according to claim 2, wherein writing of information to said wireless tag and reading of information from said wireless tag are carried out by a non-contact type read/write unit including a read section for reading tag information stored in a memory of said wireless tag and a write section for transmitting the tag information to said wireless tag and writing it into a tag information memory area.

17. A fuel cell device according to claim 2, wherein the memory of each of said wireless tags has an information memory area divided into a memory area of common information which can be read unlimitedly by persons concerned in said fuel cell device and a memory area of personal information which can be read by only a specified person of those concerned in said fuel cell device, and wherein information necessary in common for the persons concerned in said fuel cell device is written to said common information memory area and special information the specified person of those concerned in said fuel cell device has is written/read to/from said personal information memory area.

18. A fuel cell device management system for use with a fuel cell device having a material feed unit for feeding fuel of hydrocarbon system, a fuel reform unit for creating hydrogen from the material fed from said material feed unit and supplying the hydrogen, a fuel cell stack unit for generating power from the hydrogen fed from said fuel reform unit and air, a cooling water supply unit for supplying cooling water to cool said fuel cell stack unit so that said fuel cell stack unit can generate electric power stably and a control unit for controlling power output generated from said fuel cell stack unit in compliance with use purposes, said fuel cell device comprising memory means for storing information for maintenance or inspection of said fuel cell device, wherein said memory means includes a rewritable memory in which information stored in said memory is obtainable or accessible externally and information acquired externally is written into said memory by means of a wireless tag;

wherein wireless tags are attached to one or two or more of said material feed unit, fuel reform unit, fuel cell stack unit, cooling water supply unit and control unit constituting said fuel cell device; and wherein an external read/write unit including a read section for reading tag information stored in a memory of said wireless tag and a write section for writing tag information to a tag information memory area of said wireless tag is used to write information to said wireless tag and read the information written in said wireless tag in a non-contact fashion by transmitting an electric wave to said wireless tag, whereby the electric wave is transmitted to a particular wireless tag for communication through an antenna to set up a power source in said particular wireless tag in a non-contact fashion;

tag information is read out which is represented by attribute information stored in a tag information memory area of said wireless tag during installation of said external read/write unit and pieces of maintenance information stored in respective information memory areas determined in accordance with various kinds of maintenance information after installation of said unit;

the electric wave is transmitted to the particular wireless tag for communication through the antenna to set up the power source in said particular wireless tag in a non-contact fashion; and pieces of maintenance information after installation of said unit are written in individual tag information memory areas of said wireless tag determined in accordance with various kinds of maintenance information, whereby pieces of maintenance information after installation of units are collected and analyzed periodically which are stored in tag information memory areas of wireless tags attached to one or two or more of said material feed unit, fuel reform unit, fuel cell stack unit, cooling water supply unit and control unit, these units constituting said fuel cell device, thereby managing said fuel cell device such that time to conduct the next maintenance of each of said units constituting said fuel cell device can be predicted and the electric power generation state of said fuel cell device can be kept optimally.

* * * * *